US007610232B2

(12) United States Patent
MacPherson

(10) Patent No.: US 7,610,232 B2
(45) Date of Patent: Oct. 27, 2009

(54) PERIODIC RATE RESET SECURITY WITH A CONVERSION FEATURE

(76) Inventor: James MacPherson, 4 Stanwich La., Suite 150, Greenwich, CT (US) 06830

( * ) Notice: Subject to any disclaimer, the term of this patent is extended or adjusted under 35 U.S.C. 154(b) by 307 days.

(21) Appl. No.: 11/888,965

(22) Filed: Aug. 3, 2007

(65) Prior Publication Data
US 2009/0037346 A1    Feb. 5, 2009

(51) Int. Cl.
*G06Q 40/00* (2006.01)
(52) U.S. Cl. ........................................... 705/36 R
(58) Field of Classification Search .............. 705/1–45; 162/198, 263; 428/198
See application file for complete search history.

(56) References Cited

U.S. PATENT DOCUMENTS

| | | | | |
|---|---|---|---|---|
| 5,857,176 | A * | 1/1999 | Ginsberg | 705/36 R |
| 6,070,151 | A * | 5/2000 | Frankel | 705/36 R |
| 6,233,566 | B1 * | 5/2001 | Levine et al. | 705/36 R |
| 6,418,419 | B1 * | 7/2002 | Nieboer et al. | 705/37 |
| 6,466,919 | B1 * | 10/2002 | Walker et al. | 705/37 |
| 6,505,174 | B1 * | 1/2003 | Keiser et al. | 705/36 R |
| 6,629,082 | B1 * | 9/2003 | Hambrecht et al. | 705/36 R |
| 2005/0004854 | A1 * | 1/2005 | Jones et al. | 705/35 |
| 2005/0021435 | A1 * | 1/2005 | Hakanoglu et al. | 705/36 |

OTHER PUBLICATIONS

Methods and Systems for offering and servicing financial instruments. Merrill Lynch & Co. Inc. Aug. 10, 2001.*
A comparision of the earnings capitalization and the excess earnings models in the valuation of closelyheld business. Journal of Small Business Management, v34, n1, p. 1(12). Jan. 1996.*

* cited by examiner

*Primary Examiner*—Mary Cheung
*Assistant Examiner*—Tien C Nguyen
(74) *Attorney, Agent, or Firm*—Abelman, Frayne & Schwab

(57) ABSTRACT

A computer implemented method for an issuer of a periodic rate reset security with a conversion feature (PRRSC), other than a traditional convertible security issuer, to issue a PRRSC including the steps of designating the PRRSC as one of an equity or a debt instrument; designating an underlying security associated with the PRRSC; setting a conversion price and a conversion ratio for the PRRSC; designating a period for setting a periodic rate associated with the PRRSC; determining a value of the periodic rate in a market environment; and issuing the PRRSC, wherein conversion of the periodic rate reset security is non-dilutive to the net asset value and earnings per share of the underlying security of the PRRSC Issuer.

19 Claims, 23 Drawing Sheets

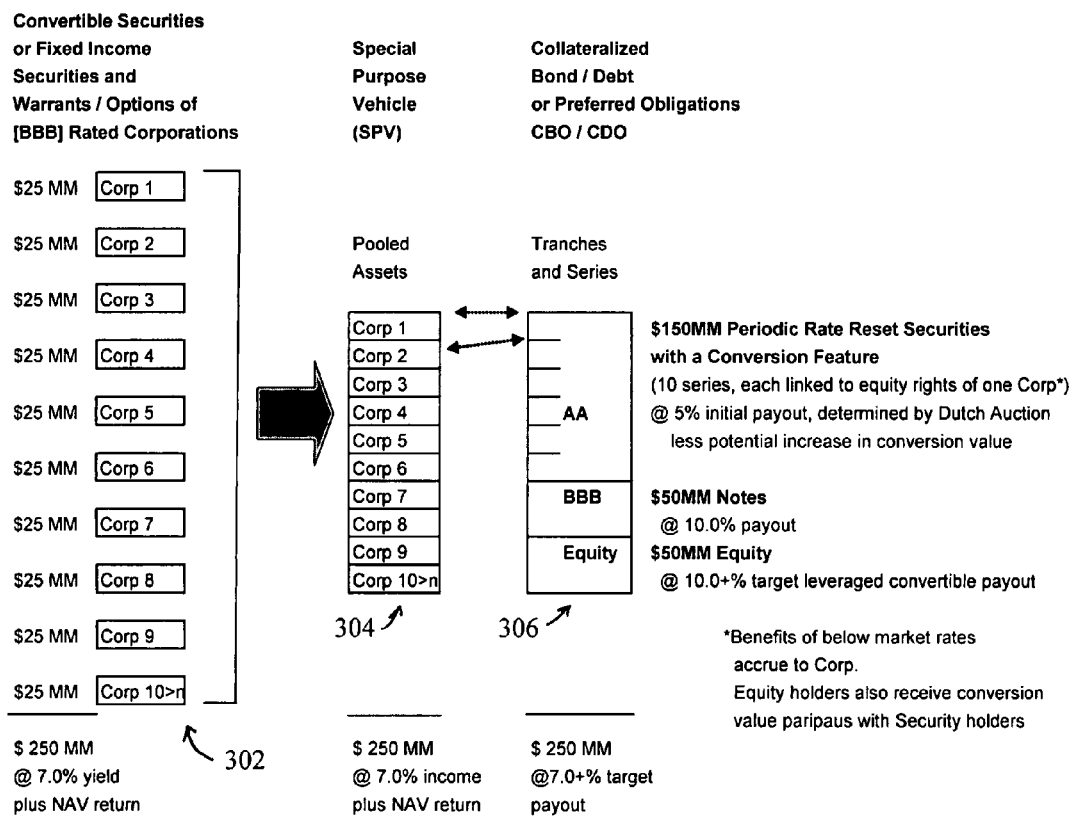
FIG. 3    300

| Auction Market Securities with a Conversion Feature | | | | |
|---|---|---|---|---|
| | | | | Convertible |
| Assumptions | | Unleveraged | Leveraged | Leveraged |
| Common Stock Assumptions | | | | |
| Beginning Common Shares | | 30.000 | 30.000 | 30.000 |
| Beginning Common Share Price / NAV, $ per share | | 10.000 | 10.000 | 10.000 |
| Beginning Common Stock Assets, $ | | 300.000 | 300.000 | 300.000 |
| Leverage Assumptions | | | | |
| Face Value of Leverage; Convertible Securities, Preferred or Debt, $ | | 0.000 | 100.000 | 100.000 |
| Leverage % of starting portfolio | | 0.000% | 25.000% | 25.000% |
| Issuance Cost, % of Face Value | | 0.000% | 0.000% | 0.000% |
| Post-Issuance Amount of Leverage; Convertible, Preferred or Debt, $ | | 0.000 | 100.000 | 100.000 |
| Dividend / Interest Payable on Leverage, % per year | | 0.000% | 4.000% | 2.000% |
| Dividend / Interest Payable on Leverage, % per month | | 0.000% | 0.333% | 0.167% |
| Conversion Assumptions | | | | |
| Beginning Common Share Price / NAV, $ per share | | 10.000 | 10.000 | 10.000 |
| Conversion Premium (% of current common share price) | | 0.000% | 0.000% | 10.000% |
| Conversion Price ($ per common share) | | 10.000 | 10.000 | 11.000 |
| Conversion Ratio (common shares per convertible) | | - | - | 9.091 |
| Total Shares, Fully Diluted | | 30.000 | 30.000 | 39.091 |
| Portfolio Earnings Assumptions | | | | |
| Gross per cent earned on portfolio assets per year | | 4.000% | 4.000% | 4.000% |
| Gross per cent earned on portfolio assets per month | | 0.333% | 0.333% | 0.333% |
| Portfolio Appreciation Assumptions | | | | |
| Portfolio appreciation, % per year | | 9.156% | 9.156% | 9.156% |
| Appreciation of Portfolio, % per month | | 0.727% | 0.727% | 0.727% |
| | | | | |
| Assumption in BOLD are entered manually. | | | | |
| Other assumptions are automatically calculated. | | | | |

FIG. 8

| "n" months | Beginning Value of Common Stk at month=n | Beginning Value of Preferred or Debt Leverage at month=n | UNLEVERAGED STOCK APPRECIATION |||| Comm Shares Outstanding at end of month n | Per share Value (NAV) of Common Stk at beginning of month n | Per Share Value (NAV) of Common Stk at end of month n | Per Share Common Stk Annualized Appreciation for month n |
|---|---|---|---|---|---|---|---|---|---|---|
| | | | Beginning Value of Portfolio at month=n | Rate of Appreciation of Portfolio % per month | Ending Value of Portfolio at month=n | Ending Value of Common Stk at month=n | | | | |
| 1 | 300.000 | 0.000 | 300.000 | 0.7267% | 302.180 | 302.180 | 30.00 | 10.000 | 10.073 | 9.077% |
| 2 | 302.180 | 0.000 | 302.180 | 0.7267% | 304.376 | 304.376 | 30.00 | 10.073 | 10.146 | 9.077% |
| 3 | 304.376 | 0.000 | 304.376 | 0.7267% | 306.588 | 306.588 | 30.00 | 10.146 | 10.220 | 9.077% |
| 4 | 306.588 | 0.000 | 306.588 | 0.7267% | 308.816 | 308.816 | 30.00 | 10.220 | 10.294 | 9.077% |
| 5 | 308.816 | 0.000 | 308.816 | 0.7267% | 311.060 | 311.060 | 30.00 | 10.294 | 10.369 | 9.077% |
| 6 | 311.060 | 0.000 | 311.060 | 0.7267% | 313.320 | 313.320 | 30.00 | 10.369 | 10.444 | 9.077% |
| 7 | 313.320 | 0.000 | 313.320 | 0.7267% | 315.597 | 315.597 | 30.00 | 10.444 | 10.520 | 9.077% |
| 8 | 315.597 | 0.000 | 315.597 | 0.7267% | 317.890 | 317.890 | 30.00 | 10.520 | 10.596 | 9.077% |
| 9 | 317.890 | 0.000 | 317.890 | 0.7267% | 320.200 | 320.200 | 30.00 | 10.596 | 10.673 | 9.077% |
| 10 | 320.200 | 0.000 | 320.200 | 0.7267% | 322.527 | 322.527 | 30.00 | 10.673 | 10.751 | 9.077% |
| 11 | 322.527 | 0.000 | 322.527 | 0.7267% | 324.871 | 324.871 | 30.00 | 10.751 | 10.829 | 9.077% |
| 12 | 324.871 | 0.000 | 324.871 | 0.7267% | 327.231 | 327.231 | 30.00 | 10.829 | 10.908 | 9.077% |
| 13 | 327.231 | 0.000 | 327.231 | 0.7267% | 329.609 | 329.609 | 30.00 | 10.908 | 10.987 | 9.077% |
| 14 | 329.609 | 0.000 | 329.609 | 0.7267% | 332.004 | 332.004 | 30.00 | 10.987 | 11.067 | 9.077% |
| 15 | 332.004 | 0.000 | 332.004 | 0.7267% | 334.417 | 334.417 | 30.00 | 11.067 | 11.147 | 9.077% |
| 16 | 334.417 | 0.000 | 334.417 | 0.7267% | 336.847 | 336.847 | 30.00 | 11.147 | 11.228 | 9.077% |
| 17 | 336.847 | 0.000 | 336.847 | 0.7267% | 339.295 | 339.295 | 30.00 | 11.228 | 11.310 | 9.077% |
| 18 | 339.295 | 0.000 | 339.295 | 0.7267% | 341.760 | 341.760 | 30.00 | 11.310 | 11.392 | 9.077% |
| 19 | 341.760 | 0.000 | 341.760 | 0.7267% | 344.244 | 344.244 | 30.00 | 11.392 | 11.475 | 9.077% |
| 20 | 344.244 | 0.000 | 344.244 | 0.7267% | 346.745 | 346.745 | 30.00 | 11.475 | 11.558 | 9.077% |
| 21 | 346.745 | 0.000 | 346.745 | 0.7267% | 349.265 | 349.265 | 30.00 | 11.558 | 11.642 | 9.077% |
| 22 | 349.265 | 0.000 | 349.265 | 0.7267% | 351.803 | 351.803 | 30.00 | 11.642 | 11.727 | 9.077% |
| 23 | 351.803 | 0.000 | 351.803 | 0.7267% | 354.359 | 354.359 | 30.00 | 11.727 | 11.812 | 9.077% |
| 24 | 354.359 | 0.000 | 354.359 | 0.7267% | 356.934 | 356.934 | 30.00 | 11.812 | 11.898 | 9.077% |
| 25 | 356.934 | 0.000 | 356.934 | 0.7267% | 359.528 | 359.528 | 30.00 | 11.898 | 11.984 | 9.077% |
| 26 | 359.528 | 0.000 | 359.528 | 0.7267% | 362.141 | 362.141 | 30.00 | 11.984 | 12.071 | 9.077% |
| 27 | 362.141 | 0.000 | 362.141 | 0.7267% | 364.772 | 364.772 | 30.00 | 12.071 | 12.159 | 9.077% |
| 28 | 364.772 | 0.000 | 364.772 | 0.7267% | 367.423 | 367.423 | 30.00 | 12.159 | 12.247 | 9.077% |
| 29 | 367.423 | 0.000 | 367.423 | 0.7267% | 370.093 | 370.093 | 30.00 | 12.247 | 12.336 | 9.077% |
| 30 | 370.093 | 0.000 | 370.093 | 0.7267% | 372.782 | 372.782 | 30.00 | 12.336 | 12.426 | 9.077% |
| 31 | 372.782 | 0.000 | 372.782 | 0.7267% | 375.491 | 375.491 | 30.00 | 12.426 | 12.516 | 9.077% |
| 32 | 375.491 | 0.000 | 375.491 | 0.7267% | 378.220 | 378.220 | 30.00 | 12.516 | 12.607 | 9.077% |
| 33 | 378.220 | 0.000 | 378.220 | 0.7267% | 380.968 | 380.968 | 30.00 | 12.607 | 12.699 | 9.077% |
| 34 | 380.968 | 0.000 | 380.968 | 0.7267% | 383.736 | 383.736 | 30.00 | 12.699 | 12.791 | 9.077% |
| 35 | 383.736 | 0.000 | 383.736 | 0.7267% | 386.525 | 386.525 | 30.00 | 12.791 | 12.884 | 9.077% |
| 36 | 386.525 | 0.000 | 386.525 | 0.7267% | 389.334 | 389.334 | 30.00 | 12.884 | 12.978 | 9.077% |

| | | | | | UNLEVERAGED - PORTFOLIO EARNINGS | | | | | |
|---|---|---|---|---|---|---|---|---|---|---|
| "n" month | Beginning Value of Portfolio at month=n | Gross % earned on portfolio per month | Gross Portfolio Earnings for month n | Gross Cumulative Portfolio Earnings | Beginning Value of Preferred or Debt Leverage at month=n | Div/Interest Payable on Leverage per month % | Div/Interest Payable on Leverage per month $ | Cumulative Div/Interest Payable on Leverage | Net Portfolio Earnings for month N | Cumulative Net Portfolio Earnings at month n |
| 1 | 300.000 | 0.3333% | 1.000 | 1.000 | 0.000 | 0.000% | 0.000 | 0.000 | 1.000 | 1.000 |
| 2 | 302.180 | 0.3333% | 1.007 | 2.007 | 0.000 | 0.000% | 0.000 | 0.000 | 1.007 | 2.007 |
| 3 | 304.376 | 0.3333% | 1.015 | 3.022 | 0.000 | 0.000% | 0.000 | 0.000 | 1.015 | 3.022 |
| 4 | 306.588 | 0.3333% | 1.022 | 4.044 | 0.000 | 0.000% | 0.000 | 0.000 | 1.022 | 4.044 |
| 5 | 308.816 | 0.3333% | 1.029 | 5.073 | 0.000 | 0.000% | 0.000 | 0.000 | 1.029 | 5.073 |
| 6 | 311.060 | 0.3333% | 1.037 | 6.110 | 0.000 | 0.000% | 0.000 | 0.000 | 1.037 | 6.110 |
| 7 | 313.320 | 0.3333% | 1.044 | 7.154 | 0.000 | 0.000% | 0.000 | 0.000 | 1.044 | 7.154 |
| 8 | 315.597 | 0.3333% | 1.052 | 8.206 | 0.000 | 0.000% | 0.000 | 0.000 | 1.052 | 8.206 |
| 9 | 317.890 | 0.3333% | 1.060 | 9.266 | 0.000 | 0.000% | 0.000 | 0.000 | 1.060 | 9.266 |
| 10 | 320.200 | 0.3333% | 1.067 | 10.333 | 0.000 | 0.000% | 0.000 | 0.000 | 1.067 | 10.333 |
| 11 | 322.527 | 0.3333% | 1.075 | 11.409 | 0.000 | 0.000% | 0.000 | 0.000 | 1.075 | 11.409 |
| 12 | 324.871 | 0.3333% | 1.083 | 12.491 | 0.000 | 0.000% | 0.000 | 0.000 | 1.083 | 12.491 |
| 13 | 327.231 | 0.3333% | 1.091 | 13.582 | 0.000 | 0.000% | 0.000 | 0.000 | 1.091 | 13.582 |
| 14 | 329.609 | 0.3333% | 1.099 | 14.681 | 0.000 | 0.000% | 0.000 | 0.000 | 1.099 | 14.681 |
| 15 | 332.004 | 0.3333% | 1.107 | 15.788 | 0.000 | 0.000% | 0.000 | 0.000 | 1.107 | 15.788 |
| 16 | 334.417 | 0.3333% | 1.115 | 16.902 | 0.000 | 0.000% | 0.000 | 0.000 | 1.115 | 16.902 |
| 17 | 336.847 | 0.3333% | 1.123 | 18.025 | 0.000 | 0.000% | 0.000 | 0.000 | 1.123 | 18.025 |
| 18 | 339.295 | 0.3333% | 1.131 | 19.156 | 0.000 | 0.000% | 0.000 | 0.000 | 1.131 | 19.156 |
| 19 | 341.760 | 0.3333% | 1.139 | 20.295 | 0.000 | 0.000% | 0.000 | 0.000 | 1.139 | 20.295 |
| 20 | 344.244 | 0.3333% | 1.147 | 21.443 | 0.000 | 0.000% | 0.000 | 0.000 | 1.147 | 21.443 |
| 21 | 346.745 | 0.3333% | 1.156 | 22.599 | 0.000 | 0.000% | 0.000 | 0.000 | 1.156 | 22.599 |
| 22 | 349.265 | 0.3333% | 1.164 | 23.763 | 0.000 | 0.000% | 0.000 | 0.000 | 1.164 | 23.763 |
| 23 | 351.803 | 0.3333% | 1.173 | 24.935 | 0.000 | 0.000% | 0.000 | 0.000 | 1.173 | 24.935 |
| 24 | 354.359 | 0.3333% | 1.181 | 26.117 | 0.000 | 0.000% | 0.000 | 0.000 | 1.181 | 26.117 |
| 25 | 356.934 | 0.3333% | 1.190 | 27.306 | 0.000 | 0.000% | 0.000 | 0.000 | 1.190 | 27.306 |
| 26 | 359.528 | 0.3333% | 1.198 | 28.505 | 0.000 | 0.000% | 0.000 | 0.000 | 1.198 | 28.505 |
| 27 | 362.141 | 0.3333% | 1.207 | 29.712 | 0.000 | 0.000% | 0.000 | 0.000 | 1.207 | 29.712 |
| 28 | 364.772 | 0.3333% | 1.216 | 30.928 | 0.000 | 0.000% | 0.000 | 0.000 | 1.216 | 30.928 |
| 29 | 367.423 | 0.3333% | 1.225 | 32.153 | 0.000 | 0.000% | 0.000 | 0.000 | 1.225 | 32.153 |
| 30 | 370.093 | 0.3333% | 1.234 | 33.386 | 0.000 | 0.000% | 0.000 | 0.000 | 1.234 | 33.386 |
| 31 | 372.782 | 0.3333% | 1.243 | 34.629 | 0.000 | 0.000% | 0.000 | 0.000 | 1.243 | 34.629 |
| 32 | 375.491 | 0.3333% | 1.252 | 35.881 | 0.000 | 0.000% | 0.000 | 0.000 | 1.252 | 35.881 |
| 33 | 378.220 | 0.3333% | 1.261 | 37.141 | 0.000 | 0.000% | 0.000 | 0.000 | 1.261 | 37.141 |
| 34 | 380.968 | 0.3333% | 1.270 | 38.411 | 0.000 | 0.000% | 0.000 | 0.000 | 1.270 | 38.411 |
| 35 | 383.736 | 0.3333% | 1.279 | 39.690 | 0.000 | 0.000% | 0.000 | 0.000 | 1.279 | 39.690 |
| 36 | 386.525 | 0.3333% | 1.288 | 40.979 | 0.000 | 0.000% | 0.000 | 0.000 | 1.288 | 40.979 |

UNLEVERAGED - STOCK EPS

| "n" month | Net Portfolio Earnings for month n | Comm Shares Outstanding at end of month n | EPS for month n | Cumulative EPS at month n | Per share Value (NAV) of Common Stk at beginning of month n | Per share Value (NAV) of Common Stk at end of month n | Change in NAV for month N | Cumulative Change in NAV for at month n |
|---|---|---|---|---|---|---|---|---|
| 1 | 1.000 | 30.000 | 0.033 | 0.033 | 10.000 | 10.073 | 0.073 | 0.073 |
| 2 | 1.007 | 30.000 | 0.034 | 0.067 | 10.073 | 10.146 | 0.073 | 0.146 |
| 3 | 1.015 | 30.000 | 0.034 | 0.101 | 10.146 | 10.220 | 0.074 | 0.220 |
| 4 | 1.022 | 30.000 | 0.034 | 0.135 | 10.220 | 10.294 | 0.074 | 0.294 |
| 5 | 1.029 | 30.000 | 0.034 | 0.169 | 10.294 | 10.369 | 0.075 | 0.369 |
| 6 | 1.037 | 30.000 | 0.035 | 0.204 | 10.369 | 10.444 | 0.075 | 0.444 |
| 7 | 1.044 | 30.000 | 0.035 | 0.238 | 10.444 | 10.520 | 0.076 | 0.520 |
| 8 | 1.052 | 30.000 | 0.035 | 0.274 | 10.520 | 10.596 | 0.076 | 0.596 |
| 9 | 1.060 | 30.000 | 0.035 | 0.309 | 10.596 | 10.673 | 0.077 | 0.673 |
| 10 | 1.067 | 30.000 | 0.036 | 0.344 | 10.673 | 10.751 | 0.078 | 0.751 |
| 11 | 1.075 | 30.000 | 0.036 | 0.380 | 10.751 | 10.829 | 0.078 | 0.829 |
| 12 | 1.083 | 30.000 | 0.036 | 0.416 | 10.829 | 10.908 | 0.079 | 0.908 |
| 13 | 1.091 | 30.000 | 0.036 | 0.453 | 10.908 | 10.987 | 0.079 | 0.987 |
| 14 | 1.099 | 30.000 | 0.037 | 0.489 | 10.987 | 11.067 | 0.080 | 1.067 |
| 15 | 1.107 | 30.000 | 0.037 | 0.526 | 11.067 | 11.147 | 0.080 | 1.147 |
| 16 | 1.115 | 30.000 | 0.037 | 0.563 | 11.147 | 11.228 | 0.081 | 1.228 |
| 17 | 1.123 | 30.000 | 0.037 | 0.601 | 11.228 | 11.310 | 0.082 | 1.310 |
| 18 | 1.131 | 30.000 | 0.038 | 0.639 | 11.310 | 11.392 | 0.082 | 1.392 |
| 19 | 1.139 | 30.000 | 0.038 | 0.677 | 11.392 | 11.475 | 0.083 | 1.475 |
| 20 | 1.147 | 30.000 | 0.038 | 0.715 | 11.475 | 11.558 | 0.083 | 1.558 |
| 21 | 1.156 | 30.000 | 0.039 | 0.753 | 11.558 | 11.642 | 0.084 | 1.642 |
| 22 | 1.164 | 30.000 | 0.039 | 0.792 | 11.642 | 11.727 | 0.085 | 1.727 |
| 23 | 1.173 | 30.000 | 0.039 | 0.831 | 11.727 | 11.812 | 0.085 | 1.812 |
| 24 | 1.181 | 30.000 | 0.039 | 0.871 | 11.812 | 11.898 | 0.086 | 1.898 |
| 25 | 1.190 | 30.000 | 0.040 | 0.910 | 11.898 | 11.984 | 0.086 | 1.984 |
| 26 | 1.198 | 30.000 | 0.040 | 0.950 | 11.984 | 12.071 | 0.087 | 2.071 |
| 27 | 1.207 | 30.000 | 0.040 | 0.990 | 12.071 | 12.159 | 0.088 | 2.159 |
| 28 | 1.216 | 30.000 | 0.041 | 1.031 | 12.159 | 12.247 | 0.088 | 2.247 |
| 29 | 1.225 | 30.000 | 0.041 | 1.072 | 12.247 | 12.336 | 0.089 | 2.336 |
| 30 | 1.234 | 30.000 | 0.041 | 1.113 | 12.336 | 12.426 | 0.090 | 2.426 |
| 31 | 1.243 | 30.000 | 0.041 | 1.154 | 12.426 | 12.516 | 0.090 | 2.516 |
| 32 | 1.252 | 30.000 | 0.042 | 1.196 | 12.516 | 12.607 | 0.091 | 2.607 |
| 33 | 1.261 | 30.000 | 0.042 | 1.238 | 12.607 | 12.699 | 0.092 | 2.699 |
| 34 | 1.270 | 30.000 | 0.042 | 1.280 | 12.699 | 12.791 | 0.092 | 2.791 |
| 35 | 1.279 | 30.000 | 0.043 | 1.323 | 12.791 | 12.884 | 0.093 | 2.884 |
| 36 | 1.288 | 30.000 | 0.043 | 1.366 | 12.884 | 12.978 | 0.094 | 2.978 |

FIG. 11

| "n" month | UNLEVERAGED - TOTAL RETURN | | | |
|---|---|---|---|---|
| | Cumulative EPS at month n | Cumulative Change in NAV for at month n | Cumulative Total Return at month n | Comm Stock Annualized Total Return at month n |
| 1 | 0.033 | 0.073 | 0.106 | 13.488% |
| 2 | 0.067 | 0.146 | 0.213 | 13.465% |
| 3 | 0.101 | 0.220 | 0.320 | 13.442% |
| 4 | 0.135 | 0.294 | 0.429 | 13.418% |
| 5 | 0.169 | 0.369 | 0.538 | 13.395% |
| 6 | 0.204 | 0.444 | 0.648 | 13.373% |
| 7 | 0.238 | 0.520 | 0.758 | 13.350% |
| 8 | 0.274 | 0.596 | 0.870 | 13.328% |
| 9 | 0.309 | 0.673 | 0.982 | 13.306% |
| 10 | 0.344 | 0.751 | 1.095 | 13.284% |
| 11 | 0.380 | 0.829 | 1.209 | 13.262% |
| 12 | 0.416 | 0.908 | 1.324 | 13.241% |
| 13 | 0.453 | 0.987 | 1.440 | 13.220% |
| 14 | 0.489 | 1.067 | 1.556 | 13.198% |
| 15 | 0.526 | 1.147 | 1.673 | 13.178% |
| 16 | 0.563 | 1.228 | 1.792 | 13.157% |
| 17 | 0.601 | 1.310 | 1.911 | 13.136% |
| 18 | 0.639 | 1.392 | 2.031 | 13.116% |
| 19 | 0.677 | 1.475 | 2.151 | 13.096% |
| 20 | 0.715 | 1.558 | 2.273 | 13.076% |
| 21 | 0.753 | 1.642 | 2.395 | 13.056% |
| 22 | 0.792 | 1.727 | 2.519 | 13.036% |
| 23 | 0.831 | 1.812 | 2.643 | 13.017% |
| 24 | 0.871 | 1.898 | 2.768 | 12.997% |
| 25 | 0.910 | 1.984 | 2.894 | 12.978% |
| 26 | 0.950 | 2.071 | 3.022 | 12.959% |
| 27 | 0.990 | 2.159 | 3.149 | 12.940% |
| 28 | 1.031 | 2.247 | 3.278 | 12.921% |
| 29 | 1.072 | 2.336 | 3.408 | 12.903% |
| 30 | 1.113 | 2.426 | 3.539 | 12.884% |
| 31 | 1.154 | 2.516 | 3.671 | 12.866% |
| 32 | 1.196 | 2.607 | 3.803 | 12.848% |
| 33 | 1.238 | 2.699 | 3.937 | 12.830% |
| 34 | 1.280 | 2.791 | 4.072 | 12.812% |
| 35 | 1.323 | 2.884 | 4.207 | 12.795% |
| 36 | 1.366 | 2.978 | 4.344 | 12.777% |

FIG. 12

LEVERAGED STOCK - APPRECIATION

| "n" months | Beginning Value of Common Stk at month=n | Beginning Value of Preferred or Debt Leverage at month=n | Beginning Value of Portfolio at month=n | Rate of Appreciation of Portfolio % per month | Ending Value of Portfolio at month=n | Ending Value of Common Stk at month=n | Comm Shares Outstanding at end of month n | Per share Value (NAV) of Common Stk at beginning of month n | Per share Value (NAV) of Common Stk at end of month n | Per Share Common Stk Annualized Appreciation for month n |
|---|---|---|---|---|---|---|---|---|---|---|
| 1 | 300.000 | 100.000 | 400.000 | 0.7267% | 402.907 | 302.907 | 30.00 | 10.000 | 10.097 | 12.267% |
| 2 | 302.907 | 100.000 | 402.907 | 0.7267% | 405.834 | 305.834 | 30.00 | 10.097 | 10.194 | 12.251% |
| 3 | 305.834 | 100.000 | 405.834 | 0.7267% | 408.784 | 308.784 | 30.00 | 10.194 | 10.293 | 12.236% |
| 4 | 308.784 | 100.000 | 408.784 | 0.7267% | 411.754 | 311.754 | 30.00 | 10.293 | 10.392 | 12.221% |
| 5 | 311.754 | 100.000 | 411.754 | 0.7267% | 414.746 | 314.746 | 30.00 | 10.392 | 10.492 | 12.205% |
| 6 | 314.746 | 100.000 | 414.746 | 0.7267% | 417.760 | 317.760 | 30.00 | 10.492 | 10.592 | 12.190% |
| 7 | 317.760 | 100.000 | 417.760 | 0.7267% | 420.796 | 320.796 | 30.00 | 10.592 | 10.693 | 12.176% |
| 8 | 320.796 | 100.000 | 420.796 | 0.7267% | 423.853 | 323.853 | 30.00 | 10.693 | 10.795 | 12.161% |
| 9 | 323.853 | 100.000 | 423.853 | 0.7267% | 426.933 | 326.933 | 30.00 | 10.795 | 10.898 | 12.146% |
| 10 | 326.933 | 100.000 | 426.933 | 0.7267% | 430.036 | 330.036 | 30.00 | 10.898 | 11.001 | 12.132% |
| 11 | 330.036 | 100.000 | 430.036 | 0.7267% | 433.161 | 333.161 | 30.00 | 11.001 | 11.105 | 12.117% |
| 12 | 333.161 | 100.000 | 433.161 | 0.7267% | 436.308 | 336.308 | 30.00 | 11.105 | 11.210 | 12.103% |
| 13 | 336.308 | 100.000 | 436.308 | 0.7267% | 439.479 | 339.479 | 30.00 | 11.210 | 11.316 | 12.089% |
| 14 | 339.479 | 100.000 | 439.479 | 0.7267% | 442.672 | 342.672 | 30.00 | 11.316 | 11.422 | 12.074% |
| 15 | 342.672 | 100.000 | 442.672 | 0.7267% | 445.889 | 345.889 | 30.00 | 11.422 | 11.530 | 12.061% |
| 16 | 345.889 | 100.000 | 445.889 | 0.7267% | 449.129 | 349.129 | 30.00 | 11.530 | 11.638 | 12.047% |
| 17 | 349.129 | 100.000 | 449.129 | 0.7267% | 452.393 | 352.393 | 30.00 | 11.638 | 11.746 | 12.033% |
| 18 | 352.393 | 100.000 | 452.393 | 0.7267% | 455.680 | 355.680 | 30.00 | 11.746 | 11.856 | 12.019% |
| 19 | 355.680 | 100.000 | 455.680 | 0.7267% | 458.992 | 358.992 | 30.00 | 11.856 | 11.966 | 12.006% |
| 20 | 358.992 | 100.000 | 458.992 | 0.7267% | 462.327 | 362.327 | 30.00 | 11.966 | 12.078 | 11.992% |
| 21 | 362.327 | 100.000 | 462.327 | 0.7267% | 465.687 | 365.687 | 30.00 | 12.078 | 12.190 | 11.979% |
| 22 | 365.687 | 100.000 | 465.687 | 0.7267% | 469.071 | 369.071 | 30.00 | 12.190 | 12.302 | 11.966% |
| 23 | 369.071 | 100.000 | 469.071 | 0.7267% | 472.479 | 372.479 | 30.00 | 12.302 | 12.416 | 11.952% |
| 24 | 372.479 | 100.000 | 472.479 | 0.7267% | 475.912 | 375.912 | 30.00 | 12.416 | 12.530 | 11.939% |
| 25 | 375.912 | 100.000 | 475.912 | 0.7267% | 479.371 | 379.371 | 30.00 | 12.530 | 12.646 | 11.926% |
| 26 | 379.371 | 100.000 | 479.371 | 0.7267% | 482.854 | 382.854 | 30.00 | 12.646 | 12.762 | 11.914% |
| 27 | 382.854 | 100.000 | 482.854 | 0.7267% | 486.363 | 386.363 | 30.00 | 12.762 | 12.879 | 11.901% |
| 28 | 386.363 | 100.000 | 486.363 | 0.7267% | 489.897 | 389.897 | 30.00 | 12.879 | 12.997 | 11.888% |
| 29 | 389.897 | 100.000 | 489.897 | 0.7267% | 493.457 | 393.457 | 30.00 | 12.997 | 13.115 | 11.875% |
| 30 | 393.457 | 100.000 | 493.457 | 0.7267% | 497.043 | 397.043 | 30.00 | 13.115 | 13.235 | 11.863% |
| 31 | 397.043 | 100.000 | 497.043 | 0.7267% | 500.655 | 400.655 | 30.00 | 13.235 | 13.355 | 11.851% |
| 32 | 400.655 | 100.000 | 500.655 | 0.7267% | 504.293 | 404.293 | 30.00 | 13.355 | 13.476 | 11.838% |
| 33 | 404.293 | 100.000 | 504.293 | 0.7267% | 507.957 | 407.957 | 30.00 | 13.476 | 13.599 | 11.826% |
| 34 | 407.957 | 100.000 | 507.957 | 0.7267% | 511.648 | 411.648 | 30.00 | 13.599 | 13.722 | 11.814% |
| 35 | 411.648 | 100.000 | 511.648 | 0.7267% | 515.366 | 415.366 | 30.00 | 13.722 | 13.846 | 11.802% |
| 36 | 415.366 | 100.000 | 515.366 | 0.7267% | 519.111 | 419.111 | 30.00 | 13.846 | 13.970 | 11.790% |

FIG. 13

LEVERAGED STOCK - PORTFOLIO EARNINGS

| "n" month | Beginning Value of Portfolio at month=n | Gross % earned on portfolio per month | Gross Portfolio Earnings for month n | Gross Cumulative Portfolio Earnings | Beginning Value of Preferred or Debt Leverage at month=n | Div / Interest Payable on Leveage per month % | Div / Interest Payable on Leveage per month $ | Cumulative Div / Interest Payable on Leveage | Net Portfolio Earnings for month N | Net Portfolio Earnings for month n | Cumulative Net Portfolio Earnings at month n |
|---|---|---|---|---|---|---|---|---|---|---|---|
| 1 | 400.000 | 0.333% | 1.333 | 1.333 | 100.000 | 0.333% | 0.333 | 0.333 | 1.000 | 1.000 | 1.000 |
| 2 | 402.907 | 0.333% | 1.343 | 2.676 | 100.000 | 0.333% | 0.333 | 0.667 | 1.010 | 1.010 | 2.010 |
| 3 | 405.834 | 0.333% | 1.353 | 4.029 | 100.000 | 0.333% | 0.333 | 1.000 | 1.019 | 1.019 | 3.029 |
| 4 | 408.784 | 0.333% | 1.363 | 5.392 | 100.000 | 0.333% | 0.333 | 1.333 | 1.029 | 1.029 | 4.058 |
| 5 | 411.754 | 0.333% | 1.373 | 6.764 | 100.000 | 0.333% | 0.333 | 1.667 | 1.039 | 1.039 | 5.098 |
| 6 | 414.746 | 0.333% | 1.382 | 8.147 | 100.000 | 0.333% | 0.333 | 2.000 | 1.049 | 1.049 | 6.147 |
| 7 | 417.760 | 0.333% | 1.393 | 9.539 | 100.000 | 0.333% | 0.333 | 2.333 | 1.059 | 1.059 | 7.206 |
| 8 | 420.796 | 0.333% | 1.403 | 10.942 | 100.000 | 0.333% | 0.333 | 2.667 | 1.069 | 1.069 | 8.275 |
| 9 | 423.853 | 0.333% | 1.413 | 12.355 | 100.000 | 0.333% | 0.333 | 3.000 | 1.080 | 1.080 | 9.355 |
| 10 | 426.933 | 0.333% | 1.423 | 13.778 | 100.000 | 0.333% | 0.333 | 3.333 | 1.090 | 1.090 | 10.445 |
| 11 | 430.036 | 0.333% | 1.433 | 15.211 | 100.000 | 0.333% | 0.333 | 3.667 | 1.100 | 1.100 | 11.545 |
| 12 | 433.161 | 0.333% | 1.444 | 16.655 | 100.000 | 0.333% | 0.333 | 4.000 | 1.111 | 1.111 | 12.655 |
| 13 | 436.308 | 0.333% | 1.454 | 18.110 | 100.000 | 0.333% | 0.333 | 4.333 | 1.121 | 1.121 | 13.776 |
| 14 | 439.479 | 0.333% | 1.465 | 19.575 | 100.000 | 0.333% | 0.333 | 4.667 | 1.132 | 1.132 | 14.908 |
| 15 | 442.672 | 0.333% | 1.476 | 21.050 | 100.000 | 0.333% | 0.333 | 5.000 | 1.142 | 1.142 | 16.050 |
| 16 | 445.889 | 0.333% | 1.486 | 22.536 | 100.000 | 0.333% | 0.333 | 5.333 | 1.153 | 1.153 | 17.203 |
| 17 | 449.129 | 0.333% | 1.497 | 24.033 | 100.000 | 0.333% | 0.333 | 5.667 | 1.164 | 1.164 | 18.367 |
| 18 | 452.393 | 0.333% | 1.508 | 25.541 | 100.000 | 0.333% | 0.333 | 6.000 | 1.175 | 1.175 | 19.541 |
| 19 | 455.680 | 0.333% | 1.519 | 27.060 | 100.000 | 0.333% | 0.333 | 6.333 | 1.186 | 1.186 | 20.727 |
| 20 | 458.992 | 0.333% | 1.530 | 28.590 | 100.000 | 0.333% | 0.333 | 6.667 | 1.197 | 1.197 | 21.924 |
| 21 | 462.327 | 0.333% | 1.541 | 30.131 | 100.000 | 0.333% | 0.333 | 7.000 | 1.208 | 1.208 | 23.131 |
| 22 | 465.687 | 0.333% | 1.552 | 31.684 | 100.000 | 0.333% | 0.333 | 7.333 | 1.219 | 1.219 | 24.350 |
| 23 | 469.071 | 0.333% | 1.564 | 33.247 | 100.000 | 0.333% | 0.333 | 7.667 | 1.230 | 1.230 | 25.581 |
| 24 | 472.479 | 0.333% | 1.575 | 34.822 | 100.000 | 0.333% | 0.333 | 8.000 | 1.242 | 1.242 | 26.822 |
| 25 | 475.912 | 0.333% | 1.586 | 36.409 | 100.000 | 0.333% | 0.333 | 8.333 | 1.253 | 1.253 | 28.075 |
| 26 | 479.371 | 0.333% | 1.598 | 38.007 | 100.000 | 0.333% | 0.333 | 8.667 | 1.265 | 1.265 | 29.340 |
| 27 | 482.854 | 0.333% | 1.610 | 39.616 | 100.000 | 0.333% | 0.333 | 9.000 | 1.276 | 1.276 | 30.616 |
| 28 | 486.363 | 0.333% | 1.621 | 41.237 | 100.000 | 0.333% | 0.333 | 9.333 | 1.288 | 1.288 | 31.904 |
| 29 | 489.897 | 0.333% | 1.633 | 42.870 | 100.000 | 0.333% | 0.333 | 9.667 | 1.300 | 1.300 | 33.204 |
| 30 | 493.457 | 0.333% | 1.645 | 44.515 | 100.000 | 0.333% | 0.333 | 10.000 | 1.312 | 1.312 | 34.515 |
| 31 | 497.043 | 0.333% | 1.657 | 46.172 | 100.000 | 0.333% | 0.333 | 10.333 | 1.323 | 1.323 | 35.839 |
| 32 | 500.655 | 0.333% | 1.669 | 47.841 | 100.000 | 0.333% | 0.333 | 10.667 | 1.336 | 1.336 | 37.174 |
| 33 | 504.293 | 0.333% | 1.681 | 49.522 | 100.000 | 0.333% | 0.333 | 11.000 | 1.348 | 1.348 | 38.522 |
| 34 | 507.957 | 0.333% | 1.693 | 51.215 | 100.000 | 0.333% | 0.333 | 11.333 | 1.360 | 1.360 | 39.882 |
| 35 | 511.648 | 0.333% | 1.705 | 52.920 | 100.000 | 0.333% | 0.333 | 11.667 | 1.372 | 1.372 | 41.254 |
| 36 | 515.366 | 0.333% | 1.718 | 54.638 | 100.000 | 0.333% | 0.333 | 12.000 | 1.385 | 1.385 | 42.638 |

FIG. 14

| | | | | LEVERAGED STOCK - STOCK EPS | | | | |
|---|---|---|---|---|---|---|---|---|
| | | Comm Shares Outstanding | | | | Per share Value (NAV) of Common Stk at beginning of | Per share Value (NAV) of Common Stk at end of | Change in NAV for | Cumulative Change in NAV for |
| "n" month | Net Portfolio Earnings for month n | at end of month n | EPS for month n | Cumulative EPS at month n | | month n | month n | month N | at month n |
| 1 | 1.000 | 30.000 | 0.033 | 0.033 | | 10.000 | 10.097 | 0.097 | 0.097 |
| 2 | 1.010 | 30.000 | 0.034 | 0.067 | | 10.097 | 10.194 | 0.098 | 0.194 |
| 3 | 1.019 | 30.000 | 0.034 | 0.101 | | 10.194 | 10.293 | 0.098 | 0.293 |
| 4 | 1.029 | 30.000 | 0.034 | 0.135 | | 10.293 | 10.392 | 0.099 | 0.392 |
| 5 | 1.039 | 30.000 | 0.035 | 0.170 | | 10.392 | 10.492 | 0.100 | 0.492 |
| 6 | 1.049 | 30.000 | 0.035 | 0.205 | | 10.492 | 10.592 | 0.100 | 0.592 |
| 7 | 1.059 | 30.000 | 0.035 | 0.240 | | 10.592 | 10.693 | 0.101 | 0.693 |
| 8 | 1.069 | 30.000 | 0.036 | 0.276 | | 10.693 | 10.795 | 0.102 | 0.795 |
| 9 | 1.080 | 30.000 | 0.036 | 0.312 | | 10.795 | 10.898 | 0.103 | 0.898 |
| 10 | 1.090 | 30.000 | 0.036 | 0.348 | | 10.898 | 11.001 | 0.103 | 1.001 |
| 11 | 1.100 | 30.000 | 0.037 | 0.385 | | 11.001 | 11.105 | 0.104 | 1.105 |
| 12 | 1.111 | 30.000 | 0.037 | 0.422 | | 11.105 | 11.210 | 0.105 | 1.210 |
| 13 | 1.121 | 30.000 | 0.037 | 0.459 | | 11.210 | 11.316 | 0.106 | 1.316 |
| 14 | 1.132 | 30.000 | 0.038 | 0.497 | | 11.316 | 11.422 | 0.106 | 1.422 |
| 15 | 1.142 | 30.000 | 0.038 | 0.535 | | 11.422 | 11.530 | 0.107 | 1.530 |
| 16 | 1.153 | 30.000 | 0.038 | 0.573 | | 11.530 | 11.638 | 0.108 | 1.638 |
| 17 | 1.164 | 30.000 | 0.039 | 0.612 | | 11.638 | 11.746 | 0.109 | 1.746 |
| 18 | 1.175 | 30.000 | 0.039 | 0.651 | | 11.746 | 11.856 | 0.110 | 1.856 |
| 19 | 1.186 | 30.000 | 0.040 | 0.691 | | 11.856 | 11.966 | 0.110 | 1.966 |
| 20 | 1.197 | 30.000 | 0.040 | 0.731 | | 11.966 | 12.078 | 0.111 | 2.078 |
| 21 | 1.208 | 30.000 | 0.040 | 0.771 | | 12.078 | 12.190 | 0.112 | 2.190 |
| 22 | 1.219 | 30.000 | 0.041 | 0.812 | | 12.190 | 12.302 | 0.113 | 2.302 |
| 23 | 1.230 | 30.000 | 0.041 | 0.853 | | 12.302 | 12.416 | 0.114 | 2.416 |
| 24 | 1.242 | 30.000 | 0.041 | 0.894 | | 12.416 | 12.530 | 0.114 | 2.530 |
| 25 | 1.253 | 30.000 | 0.042 | 0.936 | | 12.530 | 12.646 | 0.115 | 2.646 |
| 26 | 1.265 | 30.000 | 0.042 | 0.978 | | 12.646 | 12.762 | 0.116 | 2.762 |
| 27 | 1.276 | 30.000 | 0.043 | 1.021 | | 12.762 | 12.879 | 0.117 | 2.879 |
| 28 | 1.288 | 30.000 | 0.043 | 1.063 | | 12.879 | 12.997 | 0.118 | 2.997 |
| 29 | 1.300 | 30.000 | 0.043 | 1.107 | | 12.997 | 13.115 | 0.119 | 3.115 |
| 30 | 1.312 | 30.000 | 0.044 | 1.151 | | 13.115 | 13.235 | 0.120 | 3.235 |
| 31 | 1.323 | 30.000 | 0.044 | 1.195 | | 13.235 | 13.355 | 0.120 | 3.355 |
| 32 | 1.336 | 30.000 | 0.045 | 1.239 | | 13.355 | 13.476 | 0.121 | 3.476 |
| 33 | 1.348 | 30.000 | 0.045 | 1.284 | | 13.476 | 13.599 | 0.122 | 3.599 |
| 34 | 1.360 | 30.000 | 0.045 | 1.329 | | 13.599 | 13.722 | 0.123 | 3.722 |
| 35 | 1.372 | 30.000 | 0.046 | 1.375 | | 13.722 | 13.846 | 0.124 | 3.846 |
| 36 | 1.385 | 30.000 | 0.046 | 1.421 | | 13.846 | 13.970 | 0.125 | 3.970 |

FIG. 15

| "n" month | LEVERAGED STOCK - TOTAL RETURN | | | Comm Stock Annualized Total Return at month n |
|---|---|---|---|---|
| | Cumulative EPS at month n | Cumulative Change in NAV for at month n | Cumulative Total Return at month n | |
| 1 | 0.033 | 0.097 | 0.130 | 16.796% |
| 2 | 0.067 | 0.194 | 0.261 | 16.750% |
| 3 | 0.101 | 0.293 | 0.394 | 16.705% |
| 4 | 0.135 | 0.392 | 0.527 | 16.661% |
| 5 | 0.170 | 0.492 | 0.661 | 16.616% |
| 6 | 0.205 | 0.592 | 0.797 | 16.573% |
| 7 | 0.240 | 0.693 | 0.933 | 16.530% |
| 8 | 0.276 | 0.795 | 1.071 | 16.487% |
| 9 | 0.312 | 0.898 | 1.210 | 16.445% |
| 10 | 0.348 | 1.001 | 1.349 | 16.403% |
| 11 | 0.385 | 1.105 | 1.490 | 16.362% |
| 12 | 0.422 | 1.210 | 1.632 | 16.321% |
| 13 | 0.459 | 1.316 | 1.775 | 16.281% |
| 14 | 0.497 | 1.422 | 1.919 | 16.241% |
| 15 | 0.535 | 1.530 | 2.065 | 16.201% |
| 16 | 0.573 | 1.638 | 2.211 | 16.162% |
| 17 | 0.612 | 1.746 | 2.359 | 16.124% |
| 18 | 0.651 | 1.856 | 2.507 | 16.085% |
| 19 | 0.691 | 1.966 | 2.657 | 16.048% |
| 20 | 0.731 | 2.078 | 2.808 | 16.010% |
| 21 | 0.771 | 2.190 | 2.961 | 15.973% |
| 22 | 0.812 | 2.302 | 3.114 | 15.936% |
| 23 | 0.853 | 2.416 | 3.269 | 15.900% |
| 24 | 0.894 | 2.530 | 3.424 | 15.864% |
| 25 | 0.936 | 2.646 | 3.582 | 15.829% |
| 26 | 0.978 | 2.762 | 3.740 | 15.793% |
| 27 | 1.021 | 2.879 | 3.899 | 15.758% |
| 28 | 1.063 | 2.997 | 4.060 | 15.724% |
| 29 | 1.107 | 3.115 | 4.222 | 15.690% |
| 30 | 1.151 | 3.235 | 4.385 | 15.656% |
| 31 | 1.195 | 3.355 | 4.550 | 15.622% |
| 32 | 1.239 | 3.476 | 4.716 | 15.589% |
| 33 | 1.284 | 3.599 | 4.883 | 15.556% |
| 34 | 1.329 | 3.722 | 5.051 | 15.523% |
| 35 | 1.375 | 3.846 | 5.221 | 15.491% |
| 36 | 1.421 | 3.970 | 5.392 | 15.459% |

FIG. 16

CONVERTIBLE LEVERAGED - STOCK APPRECIATION

| "n" months | Beginning Value of Common Stk at month=n | Ending Value of Preferred or Debt Leverage at month=n | Beginning Value of Portfolio at month=n | Rate of Appreciation of Portfolio % per month | Ending Value of Portfolio at month=n | Ending Value of Common Stk at month=n | Comm Shares Outstanding at beginning of month n | Comm Shares Outstanding at end of month n | Per share Value (NAV) of Common Stk at beginning of month n | Per Share Value (NAV) of Common Stk at end of month n | Per Share Common Stk Annualized Appreciation for month n |
|---|---|---|---|---|---|---|---|---|---|---|---|
| 1 | 300.000 | 100.000 | 400.000 | 0.7267% | 402.907 | 302.907 | 30.00 | 30.00 | 10.000 | 10.097 | 12.267% |
| 2 | 302.907 | 100.000 | 402.907 | 0.7267% | 405.834 | 305.834 | 30.00 | 30.00 | 10.097 | 10.194 | 12.251% |
| 3 | 305.834 | 100.000 | 405.834 | 0.7267% | 408.784 | 308.784 | 30.00 | 30.00 | 10.194 | 10.293 | 12.236% |
| 4 | 308.784 | 100.000 | 408.784 | 0.7267% | 411.754 | 311.754 | 30.00 | 30.00 | 10.293 | 10.392 | 12.221% |
| 5 | 311.754 | 100.000 | 411.754 | 0.7267% | 414.746 | 314.746 | 30.00 | 30.00 | 10.392 | 10.492 | 12.205% |
| 6 | 314.746 | 100.000 | 414.746 | 0.7267% | 417.760 | 317.760 | 30.00 | 30.00 | 10.492 | 10.592 | 12.190% |
| 7 | 317.760 | 100.000 | 417.760 | 0.7267% | 420.796 | 320.796 | 30.00 | 30.00 | 10.592 | 10.693 | 12.176% |
| 8 | 320.796 | 100.000 | 420.796 | 0.7267% | 423.853 | 323.853 | 30.00 | 30.00 | 10.693 | 10.795 | 12.161% |
| 9 | 323.853 | 100.000 | 423.853 | 0.7267% | 426.933 | 326.933 | 30.00 | 30.00 | 10.795 | 10.898 | 12.146% |
| 10 | 326.933 | 100.000 | 426.933 | 0.7267% | 430.036 | 330.036 | 30.00 | 30.00 | 10.898 | 11.001 | 12.132% |
| 11 | 330.036 | 0.000 | 430.036 | 0.7267% | 433.161 | 433.161 | 30.00 | 30.00 | 11.001 | 11.081 | 11.847% |
| 12 | 433.161 | 0.000 | 433.161 | 0.7267% | 436.308 | 436.308 | 30.00 | 39.09 | 11.081 | 11.161 | 11.614% |
| 13 | 436.308 | 0.000 | 436.308 | 0.7267% | 439.479 | 439.479 | 39.09 | 39.09 | 11.161 | 11.242 | 11.417% |
| 14 | 439.479 | 0.000 | 439.479 | 0.7267% | 442.672 | 442.672 | 39.09 | 39.09 | 11.242 | 11.324 | 11.248% |
| 15 | 442.672 | 0.000 | 442.672 | 0.7267% | 445.889 | 445.889 | 39.09 | 39.09 | 11.324 | 11.406 | 11.102% |
| 16 | 445.889 | 0.000 | 445.889 | 0.7267% | 449.129 | 449.129 | 39.09 | 39.09 | 11.406 | 11.489 | 10.974% |
| 17 | 449.129 | 0.000 | 449.129 | 0.7267% | 452.393 | 452.393 | 39.09 | 39.09 | 11.489 | 11.573 | 10.862% |
| 18 | 452.393 | 0.000 | 452.393 | 0.7267% | 455.680 | 455.680 | 39.09 | 39.09 | 11.573 | 11.657 | 10.762% |
| 19 | 455.680 | 0.000 | 455.680 | 0.7267% | 458.992 | 458.992 | 39.09 | 39.09 | 11.657 | 11.742 | 10.672% |
| 20 | 458.992 | 0.000 | 458.992 | 0.7267% | 462.327 | 462.327 | 39.09 | 39.09 | 11.742 | 11.827 | 10.592% |
| 21 | 462.327 | 0.000 | 462.327 | 0.7267% | 465.687 | 465.687 | 39.09 | 39.09 | 11.827 | 11.913 | 10.519% |
| 22 | 465.687 | 0.000 | 465.687 | 0.7267% | 469.071 | 469.071 | 39.09 | 39.09 | 11.913 | 11.999 | 10.454% |
| 23 | 469.071 | 0.000 | 469.071 | 0.7267% | 472.479 | 472.479 | 39.09 | 39.09 | 11.999 | 12.087 | 10.393% |
| 24 | 472.479 | 0.000 | 472.479 | 0.7267% | 475.912 | 475.912 | 39.09 | 39.09 | 12.087 | 12.175 | 10.338% |
| 25 | 475.912 | 0.000 | 475.912 | 0.7267% | 479.371 | 479.371 | 39.09 | 39.09 | 12.175 | 12.263 | 10.287% |
| 26 | 479.371 | 0.000 | 479.371 | 0.7267% | 482.854 | 482.854 | 39.09 | 39.09 | 12.263 | 12.352 | 10.241% |
| 27 | 482.854 | 0.000 | 482.854 | 0.7267% | 486.363 | 486.363 | 39.09 | 39.09 | 12.352 | 12.442 | 10.197% |
| 28 | 486.363 | 0.000 | 486.363 | 0.7267% | 489.897 | 489.897 | 39.09 | 39.09 | 12.442 | 12.532 | 10.157% |
| 29 | 489.897 | 0.000 | 489.897 | 0.7267% | 493.457 | 493.457 | 39.09 | 39.09 | 12.532 | 12.623 | 10.120% |
| 30 | 493.457 | 0.000 | 493.457 | 0.7267% | 497.043 | 497.043 | 39.09 | 39.09 | 12.623 | 12.715 | 10.085% |
| 31 | 497.043 | 0.000 | 497.043 | 0.7267% | 500.655 | 500.655 | 39.09 | 39.09 | 12.715 | 12.807 | 10.052% |
| 32 | 500.655 | 0.000 | 500.655 | 0.7267% | 504.293 | 504.293 | 39.09 | 39.09 | 12.807 | 12.901 | 10.022% |
| 33 | 504.293 | 0.000 | 504.293 | 0.7267% | 507.957 | 507.957 | 39.09 | 39.09 | 12.901 | 12.994 | 9.993% |
| 34 | 507.957 | 0.000 | 507.957 | 0.7267% | 511.648 | 511.648 | 39.09 | 39.09 | 12.994 | 13.089 | 9.966% |
| 35 | 511.648 | 0.000 | 511.648 | 0.7267% | 515.366 | 515.366 | 39.09 | 39.09 | 13.089 | 13.184 | 9.940% |
| 36 | 515.366 | 0.000 | 515.366 | 0.7267% | 519.111 | 519.111 | 39.09 | 39.09 | 13.184 | 13.280 | 9.916% |

FIG. 17

CONVERTIBLE LEVERAGED - PORTFOLIO EARNINGS

| "n" month | Beginning Value of Portfolio at month=n | Gross % earned on portfolio per month | Gross Portfolio Earnings for month n | Gross Cumulative Portfolio Earnings | Beginning Value of Preferred or Debt Leverage at month=n | Div / Interest Payable on Leveage per month % | Div / Interest Payable on Leveage per month $ | Cumulative Div / Interest Payable on Leveage | Net Portfolio Earnings for month N | Cumulative Net Portfolio Earnings at month n |
|---|---|---|---|---|---|---|---|---|---|---|
| 1 | 400.000 | 0.333% | 1.333 | 1.333 | 100.000 | 0.167% | 0.167 | 0.167 | 1.167 | 1.167 |
| 2 | 402.907 | 0.333% | 1.343 | 2.676 | 100.000 | 0.167% | 0.167 | 0.333 | 1.176 | 2.343 |
| 3 | 405.834 | 0.333% | 1.353 | 4.029 | 100.000 | 0.167% | 0.167 | 0.500 | 1.186 | 3.529 |
| 4 | 408.784 | 0.333% | 1.363 | 5.392 | 100.000 | 0.167% | 0.167 | 0.667 | 1.196 | 4.725 |
| 5 | 411.754 | 0.333% | 1.373 | 6.764 | 100.000 | 0.167% | 0.167 | 0.833 | 1.206 | 5.931 |
| 6 | 414.746 | 0.333% | 1.382 | 8.147 | 100.000 | 0.167% | 0.167 | 1.000 | 1.216 | 7.147 |
| 7 | 417.760 | 0.333% | 1.393 | 9.539 | 100.000 | 0.167% | 0.167 | 1.167 | 1.226 | 8.373 |
| 8 | 420.796 | 0.333% | 1.403 | 10.942 | 100.000 | 0.167% | 0.167 | 1.333 | 1.236 | 9.609 |
| 9 | 423.853 | 0.333% | 1.413 | 12.355 | 100.000 | 0.167% | 0.167 | 1.500 | 1.246 | 10.855 |
| 10 | 426.933 | 0.333% | 1.423 | 13.778 | 100.000 | 0.167% | 0.167 | 1.667 | 1.256 | 12.111 |
| 11 | 430.036 | 0.333% | 1.433 | 15.211 | 0.000 | 0.167% | 0.000 | 1.667 | 1.433 | 13.545 |
| 12 | 433.161 | 0.333% | 1.444 | 16.655 | 0.000 | 0.167% | 0.000 | 1.667 | 1.444 | 14.989 |
| 13 | 436.308 | 0.333% | 1.454 | 18.110 | 0.000 | 0.167% | 0.000 | 1.667 | 1.454 | 16.443 |
| 14 | 439.479 | 0.333% | 1.465 | 19.575 | 0.000 | 0.167% | 0.000 | 1.667 | 1.465 | 17.908 |
| 15 | 442.672 | 0.333% | 1.476 | 21.050 | 0.000 | 0.167% | 0.000 | 1.667 | 1.476 | 19.383 |
| 16 | 445.889 | 0.333% | 1.486 | 22.536 | 0.000 | 0.167% | 0.000 | 1.667 | 1.486 | 20.870 |
| 17 | 449.129 | 0.333% | 1.497 | 24.033 | 0.000 | 0.167% | 0.000 | 1.667 | 1.497 | 22.367 |
| 18 | 452.393 | 0.333% | 1.508 | 25.541 | 0.000 | 0.167% | 0.000 | 1.667 | 1.508 | 23.875 |
| 19 | 455.680 | 0.333% | 1.519 | 27.060 | 0.000 | 0.167% | 0.000 | 1.667 | 1.519 | 25.394 |
| 20 | 458.992 | 0.333% | 1.530 | 28.590 | 0.000 | 0.167% | 0.000 | 1.667 | 1.530 | 26.924 |
| 21 | 462.327 | 0.333% | 1.541 | 30.131 | 0.000 | 0.167% | 0.000 | 1.667 | 1.541 | 28.465 |
| 22 | 465.687 | 0.333% | 1.552 | 31.684 | 0.000 | 0.167% | 0.000 | 1.667 | 1.552 | 30.017 |
| 23 | 469.071 | 0.333% | 1.564 | 33.247 | 0.000 | 0.167% | 0.000 | 1.667 | 1.564 | 31.581 |
| 24 | 472.479 | 0.333% | 1.575 | 34.822 | 0.000 | 0.167% | 0.000 | 1.667 | 1.575 | 33.156 |
| 25 | 475.912 | 0.333% | 1.586 | 36.409 | 0.000 | 0.167% | 0.000 | 1.667 | 1.586 | 34.742 |
| 26 | 479.371 | 0.333% | 1.598 | 38.007 | 0.000 | 0.167% | 0.000 | 1.667 | 1.598 | 36.340 |
| 27 | 482.854 | 0.333% | 1.610 | 39.616 | 0.000 | 0.167% | 0.000 | 1.667 | 1.610 | 37.949 |
| 28 | 486.363 | 0.333% | 1.621 | 41.237 | 0.000 | 0.167% | 0.000 | 1.667 | 1.621 | 39.571 |
| 29 | 489.897 | 0.333% | 1.633 | 42.870 | 0.000 | 0.167% | 0.000 | 1.667 | 1.633 | 41.204 |
| 30 | 493.457 | 0.333% | 1.645 | 44.515 | 0.000 | 0.167% | 0.000 | 1.667 | 1.645 | 42.848 |
| 31 | 497.043 | 0.333% | 1.657 | 46.172 | 0.000 | 0.167% | 0.000 | 1.667 | 1.657 | 44.505 |
| 32 | 500.655 | 0.333% | 1.669 | 47.841 | 0.000 | 0.167% | 0.000 | 1.667 | 1.669 | 46.174 |
| 33 | 504.293 | 0.333% | 1.681 | 49.522 | 0.000 | 0.167% | 0.000 | 1.667 | 1.681 | 47.855 |
| 34 | 507.957 | 0.333% | 1.693 | 51.215 | 0.000 | 0.167% | 0.000 | 1.667 | 1.693 | 49.548 |
| 35 | 511.648 | 0.333% | 1.705 | 52.920 | 0.000 | 0.167% | 0.000 | 1.667 | 1.705 | 51.254 |
| 36 | 515.366 | 0.333% | 1.718 | 54.638 | 0.000 | 0.167% | 0.000 | 1.667 | 1.718 | 52.972 |

FIG. 18

| "n" month | Net Portfolio Earnings for month N | Comm Shares Outstanding at end of month n | EPS for month n | Cumulative EPS at month n | Per share Value (NAV) of Common Stk at beginning of month n | Per share Value (NAV) of Common Stk at end of month n | Change in NAV for month N | Cumulative Change in NAV for at month n |
|---|---|---|---|---|---|---|---|---|
| | | | | CONVERTIBLE LEVERAGED - STOCK EPS | | | | |
| 1 | 1.167 | 30.000 | 0.039 | 0.039 | 10.000 | 10.097 | 0.097 | 0.097 |
| 2 | 1.176 | 30.000 | 0.039 | 0.078 | 10.097 | 10.194 | 0.098 | 0.194 |
| 3 | 1.186 | 30.000 | 0.040 | 0.118 | 10.194 | 10.293 | 0.098 | 0.293 |
| 4 | 1.196 | 30.000 | 0.040 | 0.158 | 10.293 | 10.392 | 0.099 | 0.392 |
| 5 | 1.206 | 30.000 | 0.040 | 0.198 | 10.392 | 10.492 | 0.100 | 0.492 |
| 6 | 1.216 | 30.000 | 0.041 | 0.238 | 10.492 | 10.592 | 0.100 | 0.592 |
| 7 | 1.226 | 30.000 | 0.041 | 0.279 | 10.592 | 10.693 | 0.101 | 0.693 |
| 8 | 1.236 | 30.000 | 0.041 | 0.320 | 10.693 | 10.795 | 0.102 | 0.795 |
| 9 | 1.246 | 30.000 | 0.042 | 0.362 | 10.795 | 10.898 | 0.103 | 0.898 |
| 10 | 1.256 | 30.000 | 0.042 | 0.404 | 10.898 | 11.001 | 0.103 | 1.001 |
| 11 | 1.433 | 39.091 | 0.037 | 0.440 | 11.001 | 11.081 | 0.080 | 1.081 |
| 12 | 1.444 | 39.091 | 0.037 | 0.477 | 11.081 | 11.161 | 0.081 | 1.161 |
| 13 | 1.454 | 39.091 | 0.037 | 0.515 | 11.161 | 11.242 | 0.081 | 1.242 |
| 14 | 1.465 | 39.091 | 0.037 | 0.552 | 11.242 | 11.324 | 0.082 | 1.324 |
| 15 | 1.476 | 39.091 | 0.038 | 0.590 | 11.324 | 11.406 | 0.082 | 1.406 |
| 16 | 1.486 | 39.091 | 0.038 | 0.628 | 11.406 | 11.489 | 0.083 | 1.489 |
| 17 | 1.497 | 39.091 | 0.038 | 0.666 | 11.489 | 11.573 | 0.083 | 1.573 |
| 18 | 1.508 | 39.091 | 0.039 | 0.705 | 11.573 | 11.657 | 0.084 | 1.657 |
| 19 | 1.519 | 39.091 | 0.039 | 0.743 | 11.657 | 11.742 | 0.085 | 1.742 |
| 20 | 1.530 | 39.091 | 0.039 | 0.783 | 11.742 | 11.827 | 0.085 | 1.827 |
| 21 | 1.541 | 39.091 | 0.039 | 0.822 | 11.827 | 11.913 | 0.086 | 1.913 |
| 22 | 1.552 | 39.091 | 0.040 | 0.862 | 11.913 | 11.999 | 0.087 | 1.999 |
| 23 | 1.564 | 39.091 | 0.040 | 0.902 | 11.999 | 12.087 | 0.087 | 2.087 |
| 24 | 1.575 | 39.091 | 0.040 | 0.942 | 12.087 | 12.175 | 0.088 | 2.175 |
| 25 | 1.586 | 39.091 | 0.041 | 0.983 | 12.175 | 12.263 | 0.088 | 2.263 |
| 26 | 1.598 | 39.091 | 0.041 | 1.024 | 12.263 | 12.352 | 0.089 | 2.352 |
| 27 | 1.610 | 39.091 | 0.041 | 1.065 | 12.352 | 12.442 | 0.090 | 2.442 |
| 28 | 1.621 | 39.091 | 0.041 | 1.106 | 12.442 | 12.532 | 0.090 | 2.532 |
| 29 | 1.633 | 39.091 | 0.042 | 1.148 | 12.532 | 12.623 | 0.091 | 2.623 |
| 30 | 1.645 | 39.091 | 0.042 | 1.190 | 12.623 | 12.715 | 0.092 | 2.715 |
| 31 | 1.657 | 39.091 | 0.042 | 1.232 | 12.715 | 12.807 | 0.092 | 2.807 |
| 32 | 1.669 | 39.091 | 0.043 | 1.275 | 12.807 | 12.901 | 0.093 | 2.901 |
| 33 | 1.681 | 39.091 | 0.043 | 1.318 | 12.901 | 12.994 | 0.094 | 2.994 |
| 34 | 1.693 | 39.091 | 0.043 | 1.361 | 12.994 | 13.089 | 0.094 | 3.089 |
| 35 | 1.705 | 39.091 | 0.044 | 1.405 | 13.089 | 13.184 | 0.095 | 3.184 |
| 36 | 1.718 | 39.091 | 0.044 | 1.449 | 13.184 | 13.280 | 0.096 | 3.280 |

FIG. 19

CONVERTIBLE LEVERAGED - TOTAL RETURN

| "n" month | Cumulative EPS at month n | Cumulative Change in NAV for at month n | Cumulative Total Return at month n | Comm Stock Annualized Total Return at month n |
|---|---|---|---|---|
| 1 | 0.039 | 0.097 | 0.136 | 17.567% |
| 2 | 0.078 | 0.194 | 0.273 | 17.511% |
| 3 | 0.118 | 0.293 | 0.410 | 17.455% |
| 4 | 0.158 | 0.392 | 0.549 | 17.401% |
| 5 | 0.198 | 0.492 | 0.689 | 17.347% |
| 6 | 0.238 | 0.592 | 0.830 | 17.294% |
| 7 | 0.279 | 0.693 | 0.972 | 17.241% |
| 8 | 0.320 | 0.795 | 1.115 | 17.189% |
| 9 | 0.362 | 0.898 | 1.260 | 17.138% |
| 10 | 0.404 | 1.001 | 1.405 | 17.087% |
| 11 | 0.440 | 1.081 | 1.521 | 16.705% |
| 12 | 0.477 | 1.161 | 1.639 | 16.387% |
| 13 | 0.515 | 1.242 | 1.757 | 16.115% |
| 14 | 0.552 | 1.324 | 1.876 | 15.880% |
| 15 | 0.590 | 1.406 | 1.996 | 15.674% |
| 16 | 0.628 | 1.489 | 2.117 | 15.491% |
| 17 | 0.666 | 1.573 | 2.239 | 15.328% |
| 18 | 0.705 | 1.657 | 2.362 | 15.181% |
| 19 | 0.743 | 1.742 | 2.485 | 15.048% |
| 20 | 0.783 | 1.827 | 2.610 | 14.927% |
| 21 | 0.822 | 1.913 | 2.735 | 14.815% |
| 22 | 0.862 | 1.999 | 2.861 | 14.712% |
| 23 | 0.902 | 2.087 | 2.988 | 14.616% |
| 24 | 0.942 | 2.175 | 3.117 | 14.528% |
| 25 | 0.983 | 2.263 | 3.246 | 14.444% |
| 26 | 1.024 | 2.352 | 3.376 | 14.366% |
| 27 | 1.065 | 2.442 | 3.507 | 14.293% |
| 28 | 1.106 | 2.532 | 3.638 | 14.224% |
| 29 | 1.148 | 2.623 | 3.771 | 14.158% |
| 30 | 1.190 | 2.715 | 3.905 | 14.096% |
| 31 | 1.232 | 2.807 | 4.040 | 14.036% |
| 32 | 1.275 | 2.901 | 4.176 | 13.980% |
| 33 | 1.318 | 2.994 | 4.312 | 13.926% |
| 34 | 1.361 | 3.089 | 4.450 | 13.874% |
| 35 | 1.405 | 3.184 | 4.589 | 13.824% |
| 36 | 1.449 | 3.280 | 4.729 | 13.777% |

FIG. 20

PERIODIC RATE RESET SECURITY WITH A CONVERSION FEATURE

FIELD OF THE INVENTION

This invention describes a method of (i) structuring, (ii) setting the dividend or interest rate of, and (iii) selling convertible securities such that the security is non-dilutive to Net Asset Value ("NAV") and is non-dilutive to Earnings per Share ("EPS") at the conversion price or upon conversion of the security into the underlying common stock of an issuer of a periodic rate reset security with a conversion feature (hereinafter "PRRSC Issuer"), such as a Closed-end Fund ("CEF"), Real Estate Investment Trust ("REIT"), investment grade issuer, special purpose vehicle ("SPV") among others that hold asset-backed or other securities ("Underlying Securities"), and (iv) periodically resetting the dividend or interest rate of the security for a given period. The invention is a method of creating a "Periodic Rate Reset Security with a Conversion Feature".

BACKGROUND OF THE INVENTION

The current methodology of setting dividend and interest rates on non-convertible, variable rate, fixed-income securities of traditional corporate issuers and SPVs is based on market conditions and expectations at the time of the auction or sale of non-convertible, variable rate, fixed-income security of traditional corporate issuers or SPVs. These market conditions and expectations enable potential investors to submit bids consisting of a specified dividend or interest rate, and the number of shares, bonds or units each investor is willing to purchase for a given period. The auction method is typically a Dutch auction. The variable rate for the security is set based on the highest clearing divided or interest rate that allows for all of the securities to be sold.

The variable rate may also be set by means other than an auction, such as by being linked to an objective index, including, but not limited to, term (e.g. 30, 60, 90 day) LIBOR (London InterBank Borrowing Rate) or the 60-day "AA" Composite Commercial Paper Rate, etc. The variable rate may also be set by the underwriter, initially.

In 1987, Texas Instruments Inc., a traditional industrial business, issued a Convertible Money Market Cumulative Preferred Stock ("CMMCPS") incorporating a conversion feature, and a periodic reset (variable) rate. The Texas Instrument (TI) offered "security" included three different tranches (of varying terms), all of which were offered for sale at the same time. The dividend rate on all three tranches of the offering went to "zero" during at least one dividend period because the value of the (convertibility) option embedded in the security was greater than the dividend to be given up by investors' bidding (at auction) for a "zero" dividend. The conversion of a security like CMMCPS into shares of the underlying common stock of a traditional issuer may be dilutive to both the earnings per share ("EPS") and book value (and thus price) of the common stock of the company.

Accordingly, the above-mentioned CMMCPS Security may not be well suited for traditional corporate convertible security issuers with high credit ratings, since the issuance (sale) of their equity may be a more expensive means for such issuers to raise capital compared to the cost of issuing traditional investment grade debt or preferred stock. In fact, no traditional corporate issuer has since attempted to issue CMMPPS securities.

SUMMARY OF THE INVENTION

The disadvantages heretofore associated with the prior art are overcome by the present invention of a periodic rate reset security with a conversion feature (PRRSC). The PRRSC of the present invention combines the economics of an imbedded equity conversion option with a debt obligation to lower the overall cost of capital to an issuer. A periodic "Dutch auction" or other means is used to optimize the market price of the PRRSC. When the issuer is a particular closed-end fund (CEF), real estate investment trust (REIT), investment grade issuer, special purpose vehicle (SPV), or other issuer that holds asset-backed securities, the Security of the present invention is non-dilutive to Net Asset Value (NAV) (or "Book Value") and Earnings per Share (EPS) of the issuer upon conversion of the Security. This application describes the structure of the PRRSC, and presents an algorithm to determine the appropriate conversion ratio to achieve non-dilution of NAV and EPS.

In particular, the present invention includes a computer implemented method for an issuer of a periodic rate reset security with a conversion feature (PRRSC), other than a traditional convertible security issuer, to issue a PRRSC which includes the steps of designating the PRRSC as one of an equity instrument or a debt instrument; designating an underlying security associated with the PRRSC; setting a conversion price and a conversion ratio for the PRRSC; designating a period for setting a periodic rate associated with the PRRSC; determining a value of the periodic rate in a market environment; and issuing the PRRSC, wherein conversion of the periodic rate reset security is non-dilutive to the net asset value and earnings per share of the underlying security of the PRRSC Issuer.

More specifically, the PRRSC issuer can be a Closed-End Fund, a Real Estate Investment Trust, an investment grade issuer or a special purpose vehicle issuing asset backed securities. The PRRSC is designated as one of equity or a debt instrument, such as preferred stock, a bond, a note or a debenture, and the PRRSC can be set for a fixed or perpetual term.

An underlying security associated with the PRRSC is designated, for example, the common stock of the PRRSC Issuer. Further, a conversion price and a conversion ratio are set for the PRRSC. Setting a conversion ratio includes determining the number of shares ($CLS_{ND}$) into which the security can be converted without diluting the earnings per share that would be generated by a leveraged, non-convertible security, where $CLS_{ND}=(LS_I[A_{CL}(1+R_{CL})^{t-1}]*I_{CL})/([A_L(1+R_L)^{t-1}*R_L]-(L_L*i_L))$. The conversion premium $(\%)=(\{[L_{CL}/(CLS_{ND}-LS_I)]-P_O\}*100\%)/P_O$.

The periodic rate can be a dividend in an instance the PRRSC is an equity instrument and an interest rate in an instance the PRRSC is a debt instrument. The value of the periodic rate is reset at the termination of the set period. The initial and reset value of the periodic rate is determined in a market environment, such as by an auction (e.g., Dutch auction), by negotiation, or by electronic means of matching.

The period for setting the periodic rate associated with the PRRSC includes designating one of a fixed or a variable period for setting a dividend in an instance the PRRSC is an equity instrument, and designating one of a fixed or a variable period for setting an interest rate in an instance the PRRSC is a debt instrument. The period for setting the periodic rate associated with the PRRSC is defined in contracted terms associated with the PRRSC.

The PRRSC is issued by the PRRSC issuer, and upon conversion of the periodic rate reset security, the earnings per share of the underlying security is non-dilutive to the PRRSC Issuer. Conversion of the PRRSC is also non-dilutive to the Net Asset Value or book value of the PRRSC Issuer.

In another embodiment of the invention, a computer implemented method for an issuer of a periodic rate reset security with a conversion feature (PRRSC) to issue a collateralized security is provided and includes the steps of acquiring assets including at least one of convertible debt, convertible preferred stock, and other convertible assets of several issuers, and acquiring at least one of warrants, options and associated underlying securities in addition to the convertible assets when the assets are not convertible; and issuing first securities in one of a first tranches and series, wherein the first of the tranches or series includes the PRRSC, wherein the PRRSC is over-collateralized by the assets, has one of a dividend and an interest rate set periodically, and is convertible into a designated underlying security; and issuing second securities in one of a second tranche and series that are subordinate to and less over-collateralized by the assets associated with the first securities of the first tranche or series.

The step of setting at least one of a dividend and interest rate for the PRRSC of the collateralized securities can be performed by one of an auction (e.g., a Dutch Auction), negotiation, and electronic means of matching (i.e., market environment). Further, the step of resetting one of a dividend or interest rate associated with the PRRSC can be reset in the market environment at termination of a predefined period.

BRIEF DESCRIPTION OF THE DRAWINGS

The teachings of the present invention can be readily understood by considering the following detailed description in conjunction with the accompanying drawings, in which:

FIG. 3 is a flow diagram of an illustrative Asset Backed Security structure in accordance with the present invention;

FIG. 8 is a table illustrating alternative approaches that a Periodic Rate Reset Security with a Conversion Feature (PRRSC) Issuer can employ for increasing capital;

FIG. 9 is a table illustrating appreciation of the per share value (Net Asset Value (NAV)) of a non-leveraged common stock;

FIG. 10 is a table illustrating appreciation of the portfolio earnings for the non-leveraged common stock;

FIG. 11 is a table illustrating appreciation of the earnings per share for the non-leveraged common stock;

FIG. 12 is a table illustrating appreciation of the cumulative total return for non-leveraged common stock;

FIG. 13 is a table illustrating appreciation of the per share value (NAV) of a leveraged security;

FIG. 14 is a table illustrating appreciation of the portfolio earnings for the leveraged common stock;

FIG. 15 is a table illustrating appreciation of the earnings per share for the leveraged common stock;

FIG. 16 is a table illustrating appreciation of the cumulative total return for the leveraged common stock;

FIG. 17 is a table illustrating appreciation of the per share value (NAV) of a convertible leveraged security;

FIG. 18 is a table illustrating appreciation of the portfolio earnings for a leveraged convertible security;

FIG. 19 is a table illustrating appreciation of the earnings per share for the leveraged convertible security;

FIG. 20 is a table illustrating appreciation of the cumulative total return for the leveraged convertible security;

To facilitate understanding of the invention, identical reference numerals have been used, when appropriate, to designate the same or similar elements that are common to the figures.

DETAILED DESCRIPTION OF INVENTION

Figure 1:
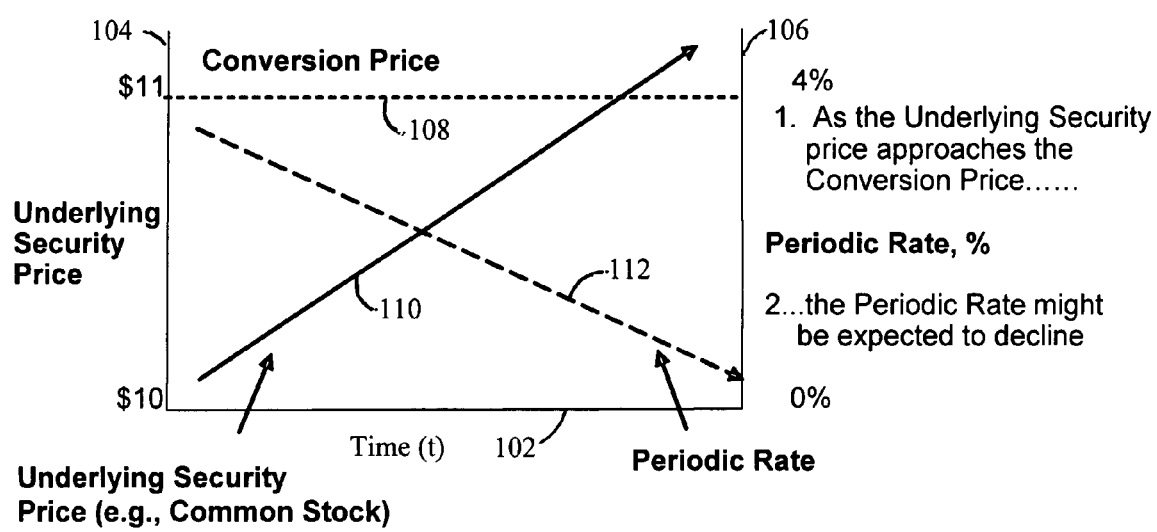
FIG. 1 is a graphical representation illustrating the relationship between the price of an Underlying Security and the periodic rate of the dividend or interest rate of the Security.

The present invention is a method of issuing a Periodic Rate Reset Security with a Conversion Feature (the "Security"). The Security can be a fixed term or a perpetual Security that pays a variable dividend or interest rate (i.e., "periodic rate"), which is set on a periodic or variable basis (the "Periodic Rate") by way of an auction (e.g., Dutch auction) or other objective means. The Security can be converted at the option of the holder into a fixed number of shares of the Underlying Security. By setting the "Conversion Ratio" (the number of shares of the Underlying Security which may be obtained upon conversion of the Security) according to an algorithm of the present invention, an issuer of a periodic rate reset security with a conversion feature (hereinafter "PRRSC Issuer") can structure the Security so that the conversion is non-dilutive to the net asset value (NAV) and earnings per share (EPS) of the common stock of the PRRSC Issuer upon converting the Security into the underlying security (e.g., common stock).

Relationship of the Periodic Rate to the Price of the Underlying Security

Because the Security has a Conversion Feature (ability of the holder to convert into the Underlying Securities), the PRRSC Issuer, such as a closed-end fund (CEF), a real estate investment trust (REIT), investment grade issuer or a special purpose vehicle (SPV) issuer, is likely to pay a reduced Periodic Rate relative to market rates as the market price of the Underlying Security (e.g., common stock or units) increases to levels near or above the Conversion Price (i.e., a fixed price), which is set at some premium above the price of the Underlying Security at the time of issue of the Security, at which the holder may convert the Security (i.e., PRRSC) into shares of the Underlying Security. The Conversion Feature is an embedded "call" option, which gives the investor the right to convert the Security into a fixed number of shares (the Conversion Ratio) of the Underlying Security. As such, the Security will typically have additional recognizable option value when the price of the Underlying Security is above the Conversion Price of the Security. The option value of the Security can be determined using well-known option pricing models such the Black Scholes model, the Cox, Ross and Rubinstein binomial model, and the like.

Referring below to TABLE I, the indicative terms of an illustrative Security is provided for better understanding of the present invention. If the Security costs, for example, $25,000 and the Conversion Price is set at $11.00 per share of the Underlying Security (e.g., common stock or units), upon conversion, a holder of the Security would obtain 2,273 shares (Conversion Ratio) of the Underlying Security for every share of the Security converted (25,000/11=2,273).

102 represents time, such as years, months, weeks, days, hours, etc. and can be scaled to illustrate linear results, such as the price of the Underlying Security 110 or the periodic rate 112. The first ordinate 104 represents price (e.g., US dollars) of the Underlying Security and the second ordinate 106 represents the Periodic Rate as a percentage (%).

When the price of the Underlying Security is far below the Conversion Price 108, the dividend or interest rate (i.e., periodic rate) associated with the Security should be just as it would be if there was no Conversion Feature. However, as the price of the Underlying Security, as illustrated by line 110 in FIG. 1, approaches or exceeds the Conversion Price 108, the value of the Security increases because of the time value (and intrinsic value, if any) of the Conversion Feature (call option) embedded in the Security. Thus, when the market price of the Underlying Security rises to levels near or above the Conversion Price 108, bidders (e.g., prospective buyers) may be willing to bid lower Periodic Rates, relative to market rates, even to zero, as illustrated by the descending broken line 112

TABLE I

Security (Periodic Rate Reset Security with a Conversion Feature) Term Sheet

| SECURITY PARAMETER | COMMENTS |
| --- | --- |
| PRRSC Issuer: | A Closed-end fund (the "Fund") listed on a Securities Exchange. |
| Offering size: | $100,000,000. Series A, B, C and D of $25,000,000 each. |
| Securities (PRRSC): | 28-day auction rate preferred stock, with a Conversion Feature, (the "Shares"). |
| Market: | Public/SEC registered. |
| Offering Price/Liquidation Preference: | $25,000 per Security. |
| Term: | Perpetual unless redeemed, or converted. |
| Auction/Dividend Reset Procedure: | Following the initial dividend period, the dividend rate on the Shares for each dividend period will be determined through a Dutch Auction process. |
| Conversion Rights: | Each Share is initially convertible into 2,273 shares of the Common Stock of the Fund (subject to adjustments under certain circumstances) at any time prior to redemption (other than during a non-conversion period) at the option of the holder. |
| Conversion Premium: | 10.0% premium to current Common Stock NAV (Net Asset Value) |
| | 4.8% premium to current Common Stock Market Price |
| Conversion Price: | $11.00 |
| Common Stock NAV | $10.00 |
| Common Stock Market Price | $10.50 |
| Optional Redemption/Call Feature: | At the option of the Fund, the Shares of any series may be redeemed out of legally available funds in whole, or in part, on the last day of the current or any future dividend period, at a redemption price of $25,000 per Share plus accumulated and unpaid dividends to the date fixed for redemption. |
| Federal Income Tax Considerations: | Certain investors in the Security may realize a tax benefit to the extent that such dividends are, for Federal income tax purposes, composed of long-term capital gains if those gains are taxed at a lower rate than ordinary income. |
| Options: | The Fund may encourage an options market in which the terms set on the options on the Common Stock of the Fund are the same, or similar to, the terms provided in the Security. |

Regarding the above-listed options security parameter in TABLE I, under certain circumstances, the PRRSC Issuer could also benefit by encouraging an options market in which the terms set on the options on the Underlying Security, e.g., Strike Price, Expiration Date, etc., are the same or similar to, the terms provided in the Conversion Feature of the Security.

Referring now to FIG. 1, a graphical representation illustrating the relationship between the price of an Underlying Security and the periodic rate of the dividend or interest rate of the Security. The chart of FIG. 1 includes an abscissa 102, a first ordinate 104 and a second ordinate 106. The abscissa in FIG. 1, and/or pay a premium for the Security in excess of its issue price. In other words, prospective buyers would normally be willing to accept a lower Periodic Rate in lieu of the increased value of the Conversion Feature (i.e., the underlying conversion option) as the Underlying Security approaches or surpasses the conversion price.

Non-Dilution for Certain PRRSC Issuers

The present invention includes a method of creating a Security for a PRRSC Issuer (such as a CEF, REIT, or SPV) other than a traditional corporate issuer where the Security has both a Periodic Rate Reset feature and a Conversion feature, and conversion is non-dilutive to EPS (assuming releverage of a similar percentage) and NAV. The invention provides a method for issuance of such a Security, including the method of setting a Conversion Ratio that is prospectively non-dilutive to EPS and NAV, the means to set and reset the Periodic Rate or price, and the means to convert the Security into an Underlying Security.

The present invention has several advantages for CEFs, REITs, investment grade issuers, SPVs and other similarly structured entities over the auction rate preferred stock, notes and commercial paper commonly offered by these entities. A feature of a CEF that distinguishes it from a traditional corporate issuer is that the issuance of additional common stock through the "at" or "near-the-money" conversion of a Security issued by a CEF is effectively anti-dilutive (accretive) to NAV, and is also potentially cumulatively anti-dilutive (accretive) to the EPS of the CEF versus a non-leveraged CEF.

Figure 2:
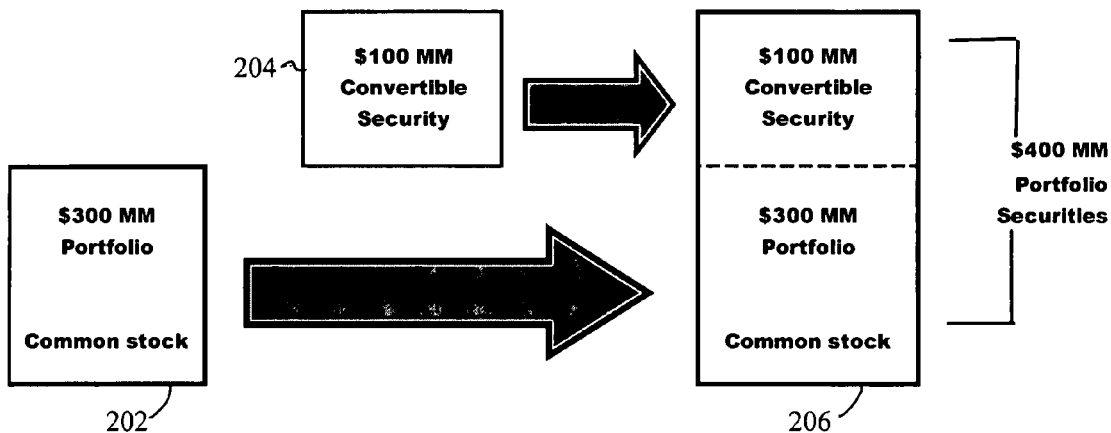
FIG. 2 is a flow diagram illustrating a closed-end fund leveraged with a Security.

Referring now FIG. 2, the flow diagram 200 illustrates how a Security is incorporated into the capital structure of a Closed-End Fund. A non-leveraged CEF 202, such as a common stock portfolio illustratively having a portfolio value of $300MM is combined with a leveraged convertible security 204 illustratively having a portfolio value of $100 MM. The resultant capitalization 206 after the offering includes the common stock portfolio and the convertible security, illustratively worth $400 MM.

Because the assets of a CEF are merely its portfolio of securities, when a CEF issues additional securities, the CEF would be expected to use the proceeds of the offering to purchase additional securities for its portfolio, the net effect of which is that its NAV per share remains essentially unchanged, subject to offering costs. A similar effect is realized for REITs and asset backed SPVs for which the issuance of additional securities would be expected to be used primarily to increase their respective portfolios of real estate related or other holdings. Because proceeds so invested can be expected to earn the same total return as the existing portfolio, conversion of the Security to common shares of the PRRSC Issuer will be non-dilutive to NAV and EPS (collectively, total return), assuming releverage in the same proportion.

Referring below now to TABLE II, an illustrative comparison of the effects on NAV and book value per share from issuing the Security by CEF, REIT, investment grade issuer or SPV versus the issuance of a traditional convertible security by a conventional corporation is illustratively shown. The illustrative values in TABLE II are based on the values described above with regard to FIGS. 1 and 2, and except for the per share price value, the values are expressed in millions (MM). The number of underlying shares of the security is 30MM shares with a par value of $10 ($300 MM/$10/share=30 MM. The CEF, REIT or SPV is assumed to earn 9.078% annually (0.727% compounded monthly) on its portfolio, as shown in the first line of TABLE II. The ending value of the portfolio at t=11 is 433.16 MM (see FIG. 13, col. 6 at n=11). Assuming the conversion price is $11, the conversion of the $100 MM in preferred or debt leveraged securities yields 9.09 MM shares (100 MM/11=9.09). Thus, the total number of shares outstanding after the conversion is 39.09 MM (30+9.09) shares.

The proceeds of the issuance can be invested in the same portfolio and earn the same 9.078% annual return. Upon conversion, the positive effect of leverage leads to an NAV of $11.08 per share (i.e., ending value of portfolio/shares outstanding after conversion ($433.16/39.09=11.08)).

By comparison, referring to the second line of TABLE II, a conventional corporation issues traditional convertible securities. Prior to the issuance, the corporation was earning the same 9.078% annual return on its portfolio as were the CEF, REIT, investment grade issuer and SPV. However, the additional proceeds of the issuance by the conventional corporation may only earn only 8.317% annually (0.668% compounded monthly) and thus the earnings of the corporation may also be diluted by the "lower-earning" equity proceeds of the convertible in the calculation of fully diluted EPS. Consequently, when the securities issued by the corporation are converted, the conversion results in a book value per share of $11.01.

The difference in NAV/book value per share in this example is indicative of the unique benefits that the Security provides to CEFs, REITs and SPVs.

TABLE II

Use of the Security by CEFs, REITs and SPVs versus a Traditional Convertible Security Issued by a Conventional Corporation, illustratively, at end of Time Period t = 11.

| PRRSC Issuer | Beginning Value of Common Stock at t = 0 | Beginning Value of Preferred Stock or Debt Leverage at t = 0 | Beginning Value of Portfolio at t = 0 | Rate of Appreciation of Portfolio % per period t | Ending Value of Portfolio at t = 11 | Shares Outstanding after Conversion | NAV/ Book Value per share |
|---|---|---|---|---|---|---|---|
| CEF, REIT, SPV | 300.00 | 100.00 | 400.00 | 0.727% | 433.16 | 39.09 | 11.08 |
| Conventional Corporation | 300.00 | 100.00 | 400.00 | 0.668% | 430.39 | 39.09 | 11.01 |

Application of the Method to Other Financial Structures

As stated in the opening paragraphs of our application, this invention is a method of (i) structuring and selling Securities that are non-dilutive to Net Asset Value ("NAV") and to Earnings per Share ("EPS") up to conversion into the common stock of a Closed-end Fund ("CEF"), Real Estate Investment Trust ("REIT"), investment grade issuer or special purpose vehicle ("SPV") holding asset-backed securities, and (ii) periodically resetting the dividend or interest payment (i.e., periodic rate) due to investors in the Security.

CBO/CDO Structures:

Referring to FIG. 3, other types of financial structures (e.g., "Asset Backed Securities") can take advantage of the present invention via a trust, corporation, holding company or other special purpose vehicle ("SPV"), for example, a Collateralized Bond Obligation ("CBO") or Collateralized Debt Obligation ("CDO") (collectively, "CBO/CDO") or other Asset Backed Security containing assets such as preferred stock, other securities, loans, contracts, real estate, mortgages, etc. ("Collateral Assets").

The flow diagram 300 of FIG. 3 includes convertible securities or fixed income securities and warrant options (i.e., assets) of rated corporations $302_1$ through $302_n$ (collectively rated corporate securities 302). The securities are rated in a well known manner by an independent service provider of credit ratings, risk evaluation, investment research and data, among other financial information to the capital markets, such as STANDARD & POORS (S&P), MOODYS, among other well known security ratings service providers.

In the example shown in FIG. 3, ten corporate securities are illustratively shown with BBB security ratings (S&P rating system), although such rating is not considered limiting. Each corporate security has a value of $25 MM at a 7.0% yield plus the NAV return. At block 304, the assets of the rated corporations 302 are pooled in a SPV with a total value of $250 MM at a 7.0% yield plus the NAV return.

Block 306 illustrates the relationship of the collateralized bond/debt or preferred obligations (CBO/CDO) with the SPV 304. The periodic rate reset securities with a conversion feature of the present invention are illustratively rated AA (by S&P) because they are over-collateralized by all of the assets in the CBO/CDO SPV, which include the BBB rated securities (e.g., notes) that are less over-collateralized, and the remaining Equity securities.

The CBO/CDO structure is a conventional financing structure (i.e., product) in the financial markets. Because of the pooling of assets (i.e. bonds or convertible bonds) and the large size of a CBO/CDO structure, liquidity of the various tranches and/or series might be greater than the liquidity of any single fixed income security. Additionally, the bifurcation, trifurcation (or further tranching) of these Collateral Assets (e.g. bonds) into higher and lower credit securities and Equity, in combination with the aforementioned potential increase in liquidity, have potentially greater value than the total of all the individual Collateral Assets (bonds) before they were pooled and securitized.

In the illustrative CBO/CDO structure of FIG. 3, the sample AA rated Securities utilize the present invention. CBO/CDO securities are issued in tranches and sometimes series, each tranche or series is associated with the total of all the corporations' debt plus warrants, or convertible debt, within the Special Purpose Vehicle 304. If convertible debt is not obtained, Warrants or Options convertible into a corporation's common stock, or another Underlying Security, can be obtained with the debt. It is not necessary that the Collateral Assets be bonds, but rather any form of Collateral Assets that are acceptable to the financial markets. The structure illustrated in the above example is not necessarily the form a CBO/CDO or Asset Backed Security must take. Many variations in the terms and details are possible, so long as there is a collection of issuers having issued some form of Collateral Asset that is pooled in a Special Purpose Vehicle 304, and a subsequent offering by the Special Purpose Vehicle 304 of over-collateralized Securities and "less" over-collateralized securities of two or more tranches and/or series including Equity securities.

Figure 4A:
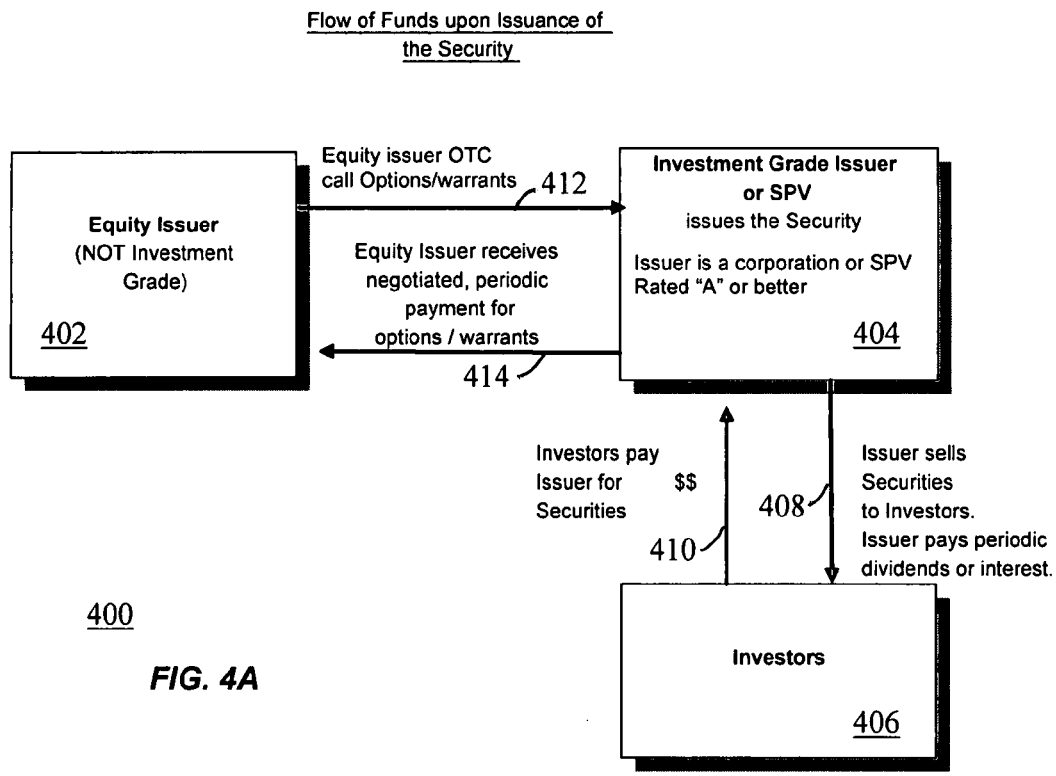
FIGS. 4A and 4B are flow diagrams illustrating the flow of funds upon issuance of a Security and upon conversion of the Security into equity in accordance with the present invention.
Figure 4B:
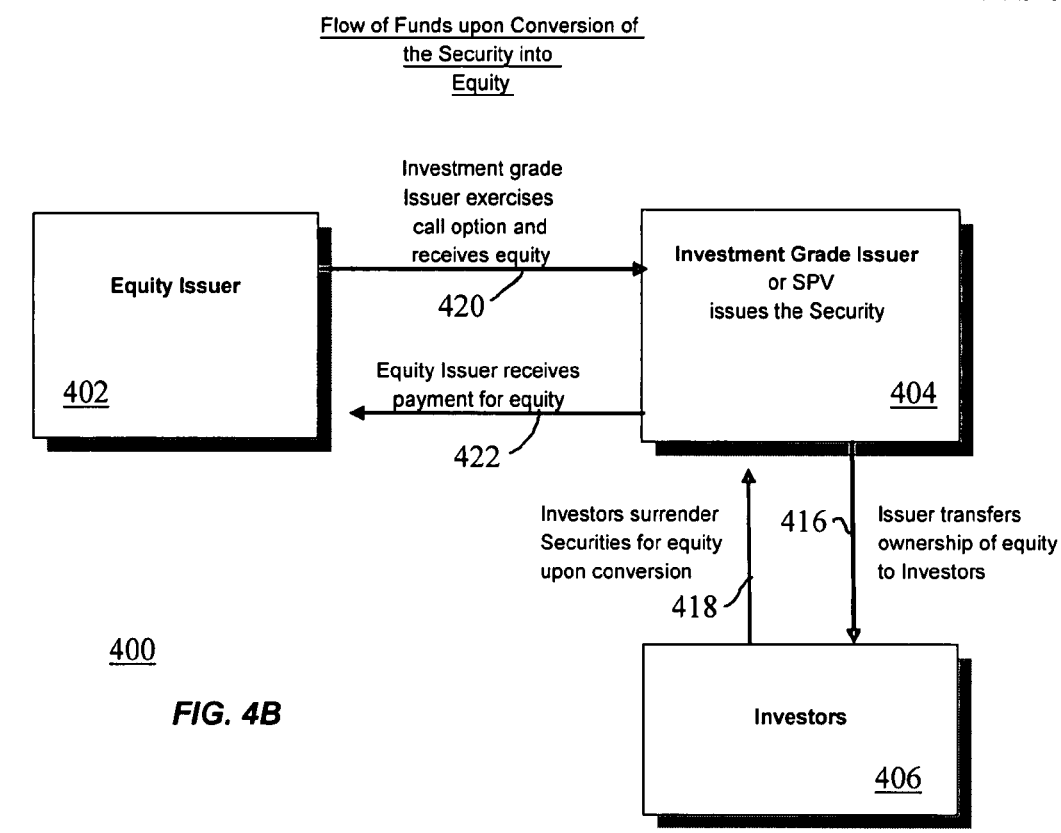

Fixed-Income/Equity Linked Securities:

Referring to FIGS. 4A and 4B, another utilization of the Security can provide potential equity issuers 402 and investment grade issuers 404 with specific advantages. Potential equity issuers 402 can obtain unique and efficient access to the equity markets when the Securities (linked to their Equity) are issued by investment grade issuers 404; which can enter into money market programs (utilizing the Security) and potentially pay lower than market rates.

FIG. 4A shows the flow of funds upon issuance of the Security. In particular, at 412 an investment grade issuer 404 enters into an agreement to purchase OTC (over-the-counter) options, or warrants, on a potential Equity issuer's stock (for physical settlement of Equity issuer's stock) from the Equity Issuer 402. The investment grade issuer 404 issues Securities linked to the common stock 408 of the Equity issuer 402. At 408, the investment grade issuer 404 sells the securities to investors 406 and the investors 406 pay the investment grade issuer 404 for the securities. The investment grade issuer pays periodic dividends or interest to the investors 406.

At 414, the Equity issuer 402 receives a negotiated payment for their option, or warrant, 414 during periods when the investment grade issuer of the Security pays below market, or zero, dividends or interest when the option embedded in the Security has market value. The Equity issuer 402 may call their option, or warrant (or investors may convert the Security) 412 when the linked Securities are in-the-money.

FIG. 4B illustrates the flow of funds upon conversion of the Security into equity. Upon conversion, at 420, the Equity issuer 402 delivers stock (plus a potential equity placement/service fee) to the investment grade issuer 404 in exchange for par/liquidation preference of the Security, in cash, as illustrated by line 422 of FIG. 4B. The investment grade issuer 404 delivers Equity issuer's stock to investors 406 as redemption/conversion of the Security. In particular, at 418, the investors surrender the Securities for equity upon conversion, and at 416, the investment grade issuer transfers ownership of the equity to the investors.

In the example illustrated by FIGS. 4A and 4B, the Equity issuer 402 has issued additional Equity and may have received a higher value for their option, or warrant, than would have ordinarily been the case. The investment grade issuer 404 has achieved a lower than market funding cost, and the investor 406 has received a greater total return from the Security than would otherwise be the case.

Figure 5:
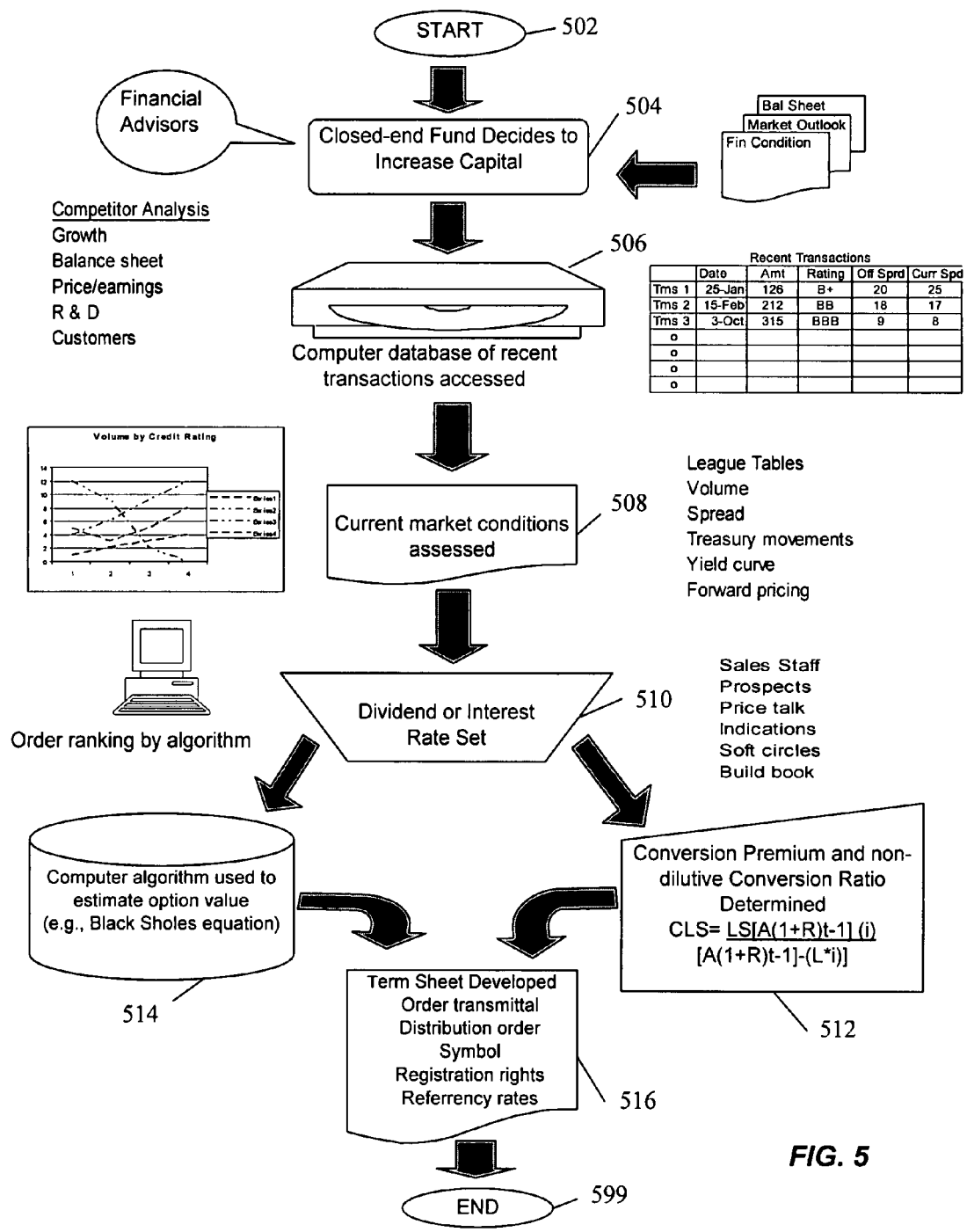
FIG. 5 is a flow diagram of a method of structuring and setting the dividend or interest rate of the Security in accordance with the present invention.
Figure 6:
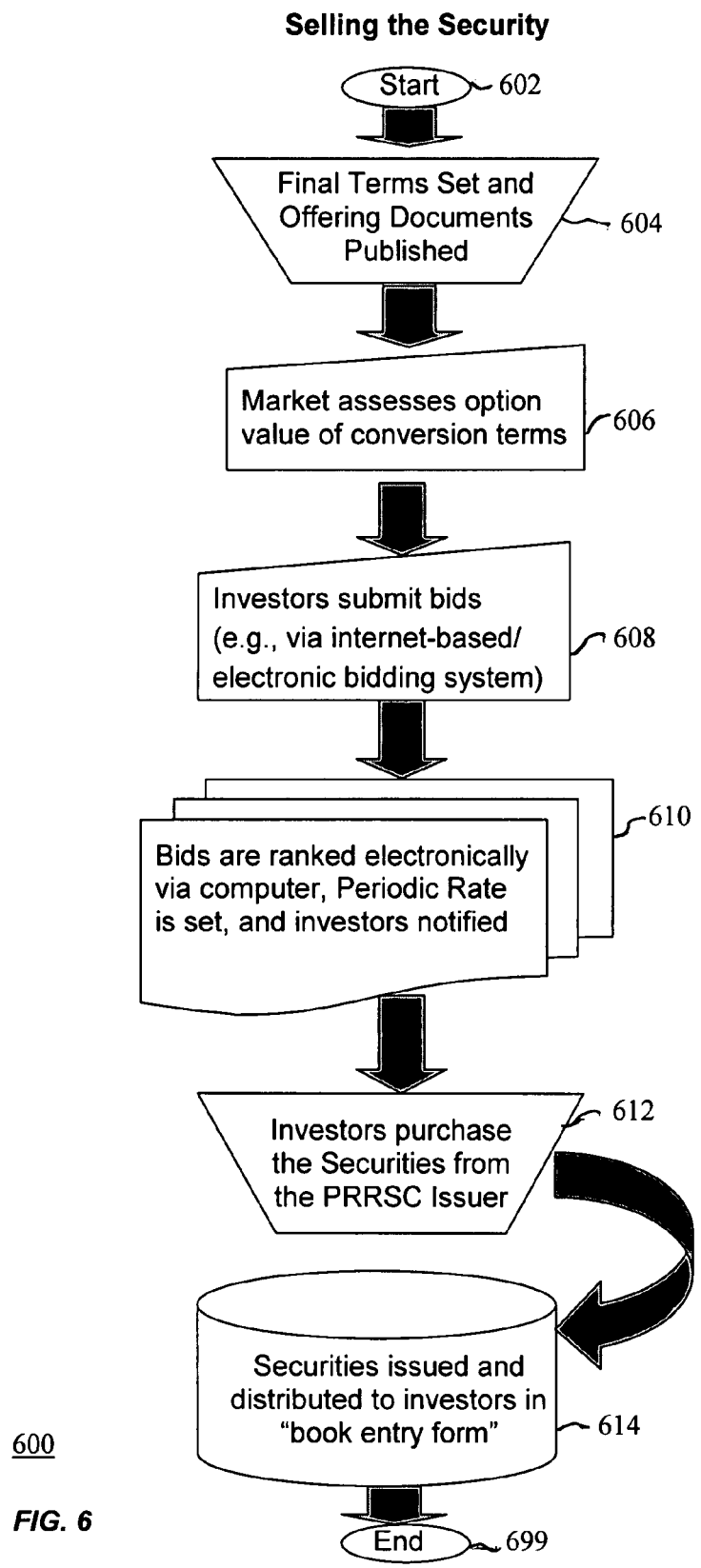
FIG. 6 is a flow diagram of a method of selling the Security in accordance with the present invention.
Figure 7:
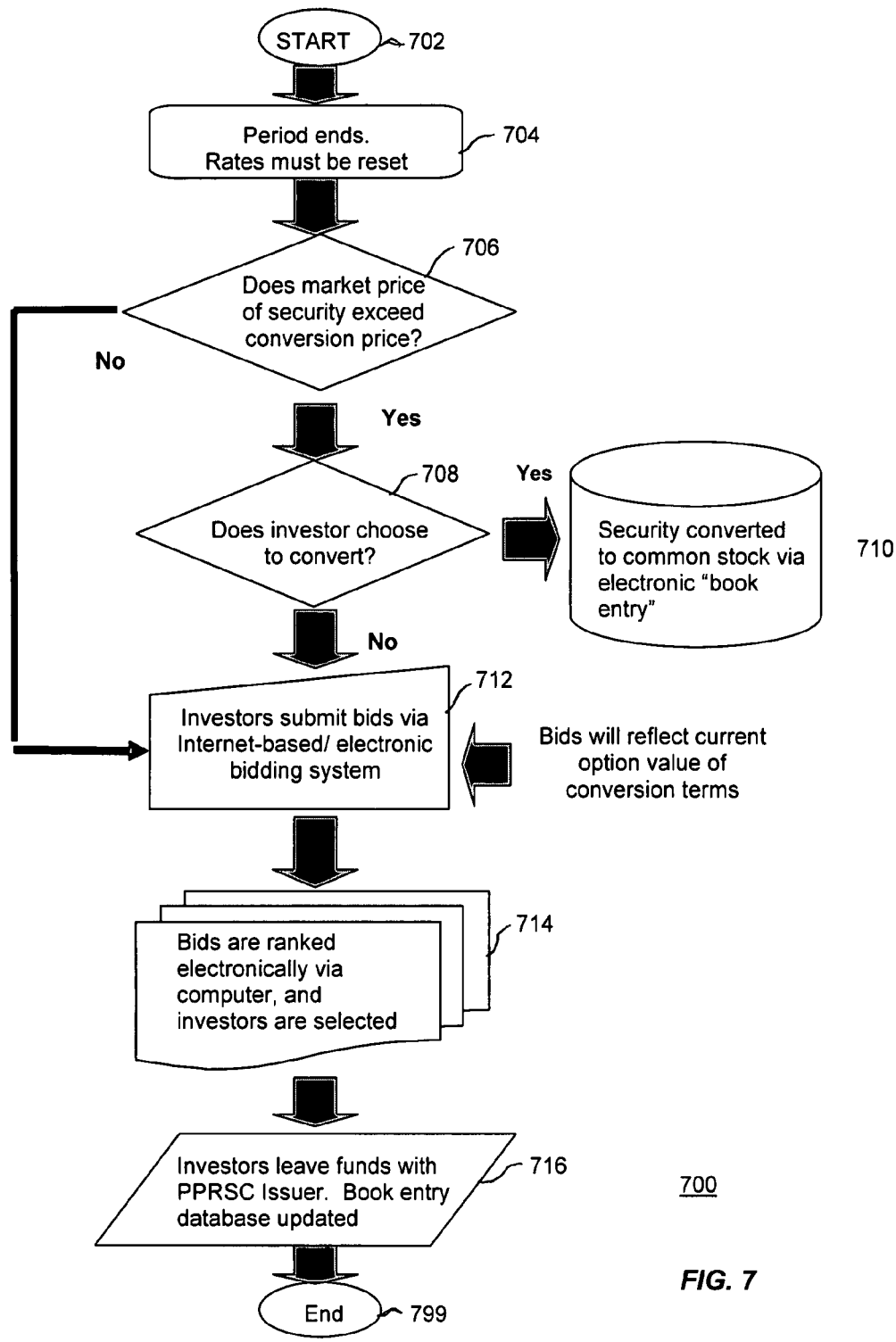
FIG. 7 is a flow diagram of a method of periodically resetting the dividend or interest rate, or exercising the conversion feature of the Security in accordance with the present invention.

Illustrations of the Method of Structuring, Setting/Resetting, and Selling the Security FIGS. 5-7 are flow diagrams provided to enhance the explanation of the invention and of the method of structuring, setting the dividend or interest rate, and selling securities that are non-dilutive to Net Asset Value and Earnings per Share upon conversion into the common stock of a CEF, REIT, investment grade issuer or SPV.

Referring now to FIG. 5, the flow diagram illustrates a method 500 of structuring and setting the dividend or interest rate of the Security in accordance with the present invention. The method 500 illustrates the process of gathering information when a PRRSC Issuer, such as a CEF requires additional capital to generate a term sheet for the Security, such as the illustrative term sheet shown above in TABLE I.

The method 500 starts at step 502 and proceeds to step 504, where the closed-end fund (or SPV or investment grade issuer or REIT) decides to increase capital. At step 506, a computer database of recent transactions is accessed to identify illustratively, for each transaction, the date of the transaction, the amount (e.g., share volume), the investment grade rating, the spreads, among other transactional information. At step 508, the information identified at step 506 is used to assess current market conditions, such as league tables, volume, spread, treasury movement, yield curves, forward pricing, among other market conditions. At step 510, the dividend or interest rate for the Security is set to be competitive in current market conditions.

At step 512, the conversion premium and conversion ratio which is non-dilutive over a given time "t" is determined. The determination of step 512 relies upon the computer algorithm shown below with regard to TABLE III and Equation (1), which is a part of the present invention.

Further, at step 514, the option value of the Security is determined using one of the option pricing models, such as the Black Sholes model, the Cox, Ross and Rubinstein binomial model, and the like.

At step 516, the option value of the conversion premium and non-dilutive conversion ratio of step 512, as well as the option value of the Security determined in step 514 is used to prepare the Security term sheet (i.e., pre-offering document), such as the illustrative Security Term Sheet shown above in TABLE I, and the method 500 ends at step 599.

Referring now to FIG. 6, the flow diagram illustrates a method 600 of selling the Security in accordance with the present invention. After the Securities have been structured (method 500 of FIG. 5), they may be sold via the process illustrated in FIG. 6. The method 600 starts at 602 and proceeds to step 604 where the final terms of the Securities are set and the documents are published with the final terms for potential investors to review. At step 606, the investors analyze these terms and assess the option value embedded in the Securities. Based on their analyses, and their view of market conditions, at step 608, investors submit bids for the securities, for example, through negotiation or internet-based or other electronic bidding system (e.g., wire-to-wire bidding system). At step 610, the bids are ranked electronically, the periodic rate is set, and the winning investors are notified.

At step 612, the investors purchase the Securities and the funds are made available to the PRRSC Issuer that issued the Securities. At step 614, in return during the securities clearing and settlement, the Securities are issued to the investors via electronic book entry, which is typically held by a trust company. At step 699, the method 600 ends.

FIG. 7 is a flow diagram of a method 700 for periodically resetting the interest rate/dividend or exercising the conversion feature of the Security. The method 700 starts at step 702 and proceeds to step 704, where the initial term period ends (e.g., the 28 day auction rate set forth in TABLE I) and the rates must be reset. At step 706 a determination is made whether the price of the Underlying Security is greater than the conversion price of the Security. If yes, the method 700 proceeds to step 708, where the investor determines whether to convert the Security into the Underlying Security (e.g., common stock). If at step 708, the determination is answered positively, then at step 710, the investor converts the Security, which will be exchanged for the Underlying Security via the electronic "book entry" system.

If at step 706, the price of the Underlying Security is less than the conversion price or at step 708, the investor does not choose to convert the Security, then at step 712, the interest rate or dividend for the next period is reset via bidding. In particular, he investors submit bids via a negotiation or internet-based or electronic bidding system, as discussed above with regard to step 608 of method 600 of FIG. 6.

The method 700 then proceeds to step 714, where the bidding of the rates is carried out by various means, and the bids are electronically ranked, for example, by descending order to determine the winning bid, and accordingly, the reset periodic rate for the Security. As described above, the bids will reflect the option value of the Security. At step 716, the investors purchase the Security by providing funds to the PRRSC Issuer, and the book entry database is updated, as described above with regard to step 616 of FIG. 6. At step 799, the method 700 ends.

Formula for Calculating the Non-Dilutive Conversion Premium for the Security

In addition to the method of creating an anti-dilutive Security for CEFs, REITs and SPVs (i.e., PRRSC Issuer), the present invention further includes a method of calculating the anti-dilutive Conversion Ratio/Premium, given the following independent variables:

1. The number of time periods elapsed since issuance of the Security;
2. Beginning total assets of the Security;
3. Rate of appreciation of the total assets;
4. Amount of leverage included in the total assets;
5. Number of shares outstanding at origination of a comparable leveraged (but not convertible) security against which the Security is being evaluated;
6. Starting price per share, at origination, of the Security.

The Conversion Ratio is expressed as the number of common shares into which the Security can be converted (the "liquidation preference"). For example, a Conversion Ratio can be expressed as follows: "Each $100 of the Security is convertible into 9.09 shares of common stock." In this example, owners of the Security would be expected to convert when the price of the common stock is greater than $11 per share, because the value of the stock exceeds the face value of the Security (>$11 per share×9.09 shares=>$100).

The method of calculating the anti-dilutive Conversion Ratio/Premium includes two formulas that are considered a part of the present invention. The first formula as expressed below in Equation (1) is the formula for calculating the Conversion Ratio, the number of shares (designated as "$CLS_{ND}$") into which the Security can be converted without diluting the earnings per share that would be generated by a leveraged (but not convertible) security. The second formula (i.e., Equation (2)) specifies how the non-dilutive Conversion Premium (designated as "Premium %" in Equation (2)) is calculated.

Referring now to TABLE I above, the Conversion Ratio is calculated as 39.09 shares, meaning that the $100 face value Security can be converted to 9.09 shares without causing dilution. Using Equation (1) with the illustrative values set forth in TABLE I, the Conversion Ratio is 9.09 shares which implies a share value for the shares of $11 (i.e., 100/9.09=11). Since the original price of shares was $10, the Conversion Premium determined by Equation (2) for the illustrative values in TABLE I is 10% (i.e., [11−10]/10).

TABLE III

Method of Determining the Non-Dilutive Conversion Premium (%) at Time t

| | |
|---|---|
| t = | The time that Underlying Security price is equal to our greater than Conversion Price of the Security (the 11$^{th}$ time period, in this example); |
| $CLS_{ND}$ = | Shares of the convertible leveraged Security outstanding at the start of time period t that are non-dilutive to earnings per share of a leveraged security; |
| $A_{CL}$ = | Beginning total assets of the convertible leveraged Security, in dollars; |
| $R_{CL}$ = | Rate of appreciation of the total assets of the convertible leveraged Security, in percent; |
| $L_{CL}$ = | Leverage amount included in the total assets of the convertible leveraged Security before conversion, in dollars; |
| $I_{CL}$ = | Interest or dividends earned on the total convertible leveraged Security assets, in percent; |
| $LS_t$ = | Shares of the leveraged security outstanding at the start of time period t; |
| $A_L$ = | Beginning total assets of the leveraged security, in dollars; |
| $R_L$ = | Rate of appreciation of the total assets of the leveraged security, in percent; |
| $I_L$ = | Interest or dividends earned on the total leveraged security assets, in percent; |

TABLE III-continued

Method of Determining the Non-Dilutive Conversion
Premium (%) at Time t $L_L$ = Leverage amount included in the total assets of the leveraged security, in dollars;
$i_L$ = Interest paid on leverage included in the total assets of the leveraged security, in percent;
$P_O$ = Starting price per share, in dollars.

$$CLS_{ND} = \frac{LS_t[A_{CL}(1+R_{CL})^{t-1}] * I_{CL}}{[A_L(1+R_L)^{t-1} * R_L] - (L_L * i_L)} \quad (1)$$

The following numerical example uses the illustrative assumptions found in TABLE I to find the non-dilutive number of shares at time=11:

$$CLS_{ND} = \frac{30[400 + (1+.007267)^{10} * (.00333)]}{[400(1+.007267)^{10} * (.00333)] - 100(.00333)}$$

$CLS_{ND} = 39.09$ shares.

Having determined the non-dilutive number of shares at time=t, the conversion premium is calculated according to the following formula:

$$\text{Premium \%} = \frac{(\{[L_{CL}/(CLS_{ND} - LS_t)] - P_O\} * 100\%)}{P_O} \quad (2)$$

Using the illustrative assumptions found in TABLE I, and $CLS_{ND}$ calculated above from Equation (1), the non-dilutive premium is calculated as follows:

Premium %=({[100/(39.09−30)]−10}*100%)/10

Premium %=10%

Potential Tax Advantage When Security Is Issued by a PRRSC Issuer

When a PRRSC Issuer, such as a Closed-End Fund ("CEF"), REIT or SPV issues Securities and characterizes them as preferred stock, special tax advantages may be captured by the Fund to the extent that capital gains rates may be lower than ordinary income rates. The IRS has taken the position in Revenue Ruling 89-81 that if a PRRSC Issuer such as a CEF, "has more than one class of shares, it may designate distributions made to each class in any year as consisting of no more than such class's proportionate share of particular types of income, such as long-term capital gains." Dividends paid on any stock of a CEF may consist of varying proportions of long-term capital gains, ordinary income (including short-term capital gains) and/or returns of capital. Long-term capital gains have been and may, in the future, be taxable to individual investors at lower rates than ordinary dividend and interest income. Thus, certain investors in the Security may, in the future, realize a tax benefit to the extent that such dividends may, for Federal income tax purposes, be composed of less highly taxed long-term capital gains.

Comparative Financial Analysis

FIGS. 8-23 provide a detailed financial analysis of the advantages of the Securities. The analysis compares three alternative approaches to increasing capital that a CEF, REIT, investment grade issuer or SPV (i.e., PRRSC issuer) might employ: "non-leveraged," "leveraged," and "convertible leveraged via Securities." For each alternative, the analysis calculates EPS, NAV and cumulative total return per share. The results of the analysis are shown in graphical and numerical form in FIGS. 20-23.

Figure 21:
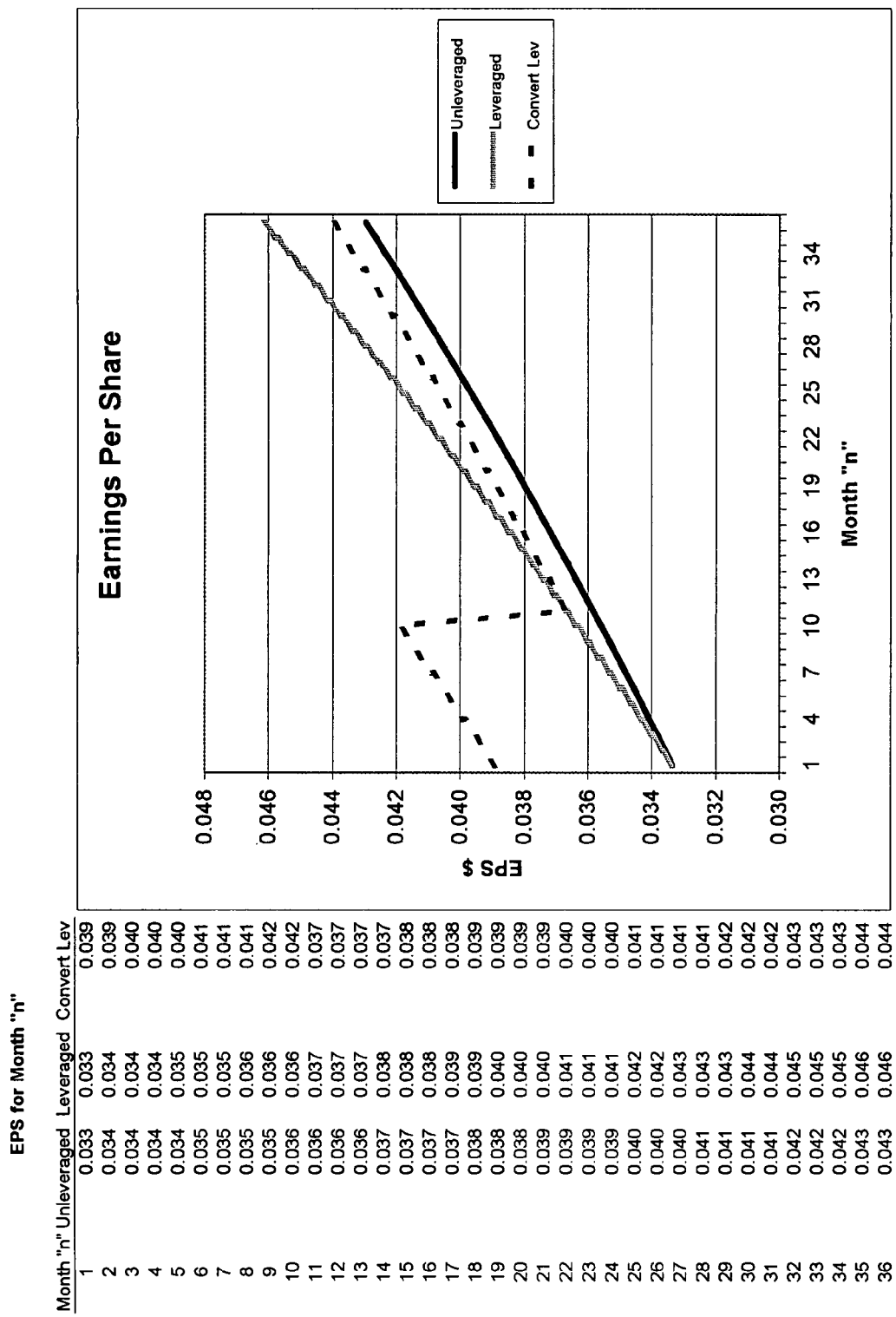
FIG. 21 is a graphical representation illustrating a comparison of earnings per share for the non-leveraged common stock, the leveraged common stock, and the leveraged convertible security.
Figure 22:
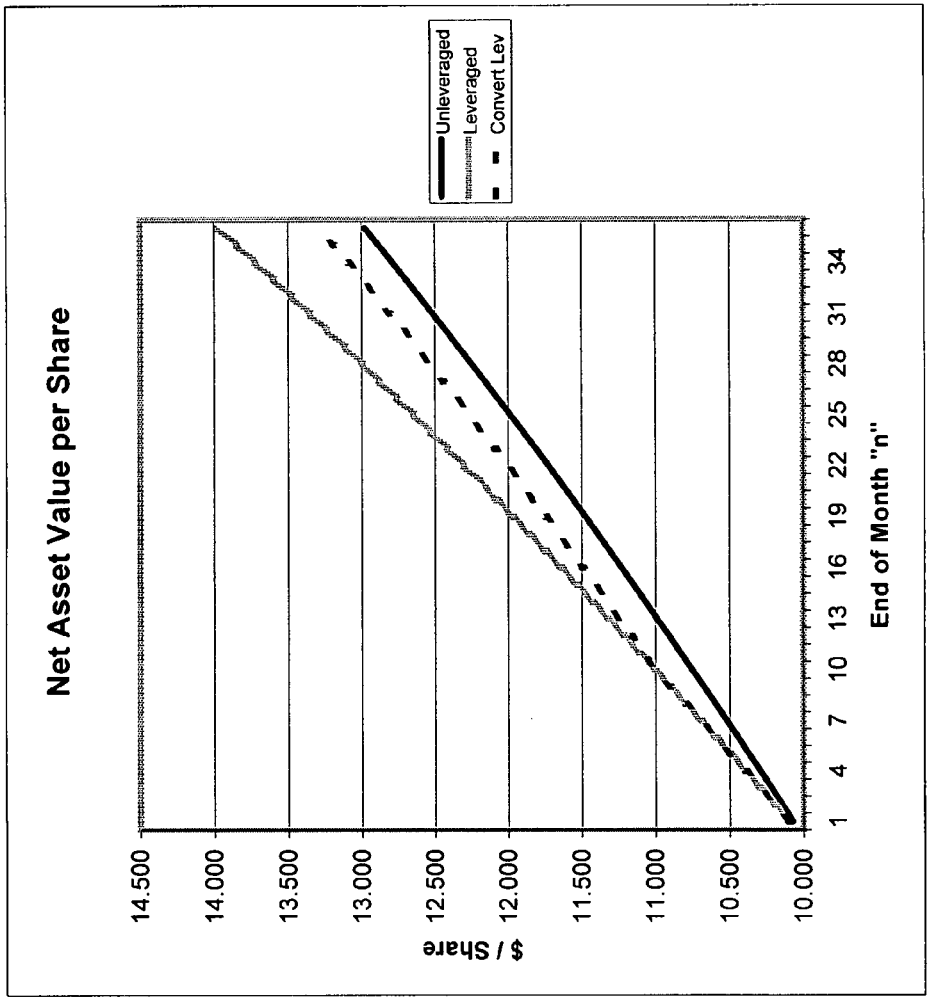
FIG. 22 is a graphical representation illustrating a comparison net asset value per share for the non-leveraged common stock, the leveraged common stock, and the leveraged convertible security.
Figure 23:
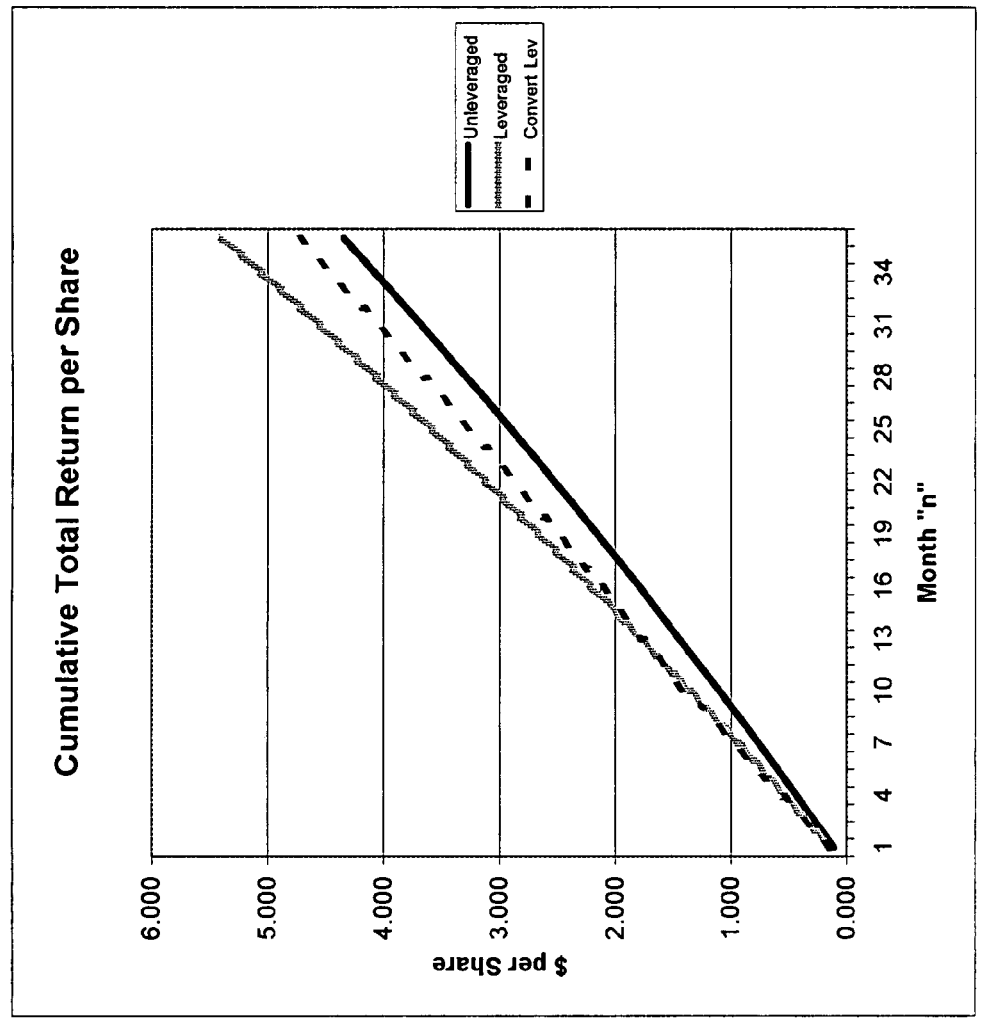
FIG. 23 is a graphical representation illustrating a comparison of cumulative total return per share for the non-leveraged common stock, the leveraged common stock, and the leveraged convertible security.

Referring to FIGS. 21-23, the results of the analyses show that i) compared to the non-leveraged approach to raising capital, the Security is favored because it is accretive to NAV and EPS, and its total return is higher; and ii) compared to the leveraged approach to raising capital, the Security is favored because it is non-dilutive to NAV and to EPS up to and at the point of conversion. Following conversion, the number of shares is increased, and thus the "per share" earnings and total return would decline relative to the leveraged approach. However, having captured the benefits of the convertible leverage, the PRRSC Issuer of the Security would be expected to issue additional leverage in a similar percentage of total assets in the same form of Security with a new, higher strike price to continue to benefit from the advantageous of the Security.

The key variable that makes the Security the preferred approach is the Conversion Premium and the value of the option embedded in the Security. The analysis shown in FIGS. 8-23 is based on the assumption that the cost to the Issuer of traditional leverage is 4% per year, while the cost to the PRRSC Issuer of convertible leverage is 2% per year; investors are willing to accept a lower interest/dividend rate in exchange for the option of converting the Security to equity. The lower cost of leverage of the Security flows through the analyses and results in higher EPS and NAV (collectively, total return) compared to the non-leveraged and leveraged approaches, up to the point of conversion.

At the present time, PRRSC Issuers (e.g., CEFs) routinely offer perpetual auction rate preferred stock without a Conversion Feature. Thus, an immediate positive impact could be felt by using the present invention with these funds.

While the foregoing is directed to embodiments of the present invention, other and further embodiments of the invention may be devised without departing from the basic scope thereof, and the scope thereof is determined by the claims that follow.

I claim:

1. A computer implemented method for an issuer of a periodic rate reset security with a conversion feature (PRRSC), other than a traditional convertible security issuer, to issue a PRRSC comprising the steps of:
    designating said PRRSC as one of an equity instrument or a debt instrument;
    designating an underlying security associated with said PRRSC;
    setting a conversion price and a conversion ratio for said PRRSC;
    designating a period for setting a periodic rate associated with said PRRSC;
    electronically determining a value of said periodic rate in a market environment; and
    issuing the PRRSC, wherein conversion of said periodic rate reset security is non-dilutive to the net asset value and earnings per share of the underlying security of the PRRSC Issuer.

2. The method of claim 1, wherein said PRRSC is one of a preferred stock, a bond, a note or a debenture.

3. The method of claim 1, wherein said underlying security associated with the PRRSC is common stock of the PRRSC Issuer.

4. The method of claim 1, wherein said periodic rate is one of a dividend in an instance said PRRSC is an equity instrument and an interest rate in an instance said PRRSC is a debt instrument.

5. The method of claim 1, wherein said setting a conversion ratio comprises the step of determining the number of shares ($CLS_{ND}$) into which the security can be converted without diluting the earnings per share that would be generated by a leveraged, non-convertible security, where $CLS_{ND} = (LS_t[A_{CL}(1+R_{CL})^{t-1}]*I_{CL})/([A_L(1+R_L)^{t-1}*R_L]-(L_L*i_L))$.

6. The method of claim 5, further comprising the step of determining a conversion premium, where said conversion premium $(\%) = (\{[L_{CL}/(CLS_{ND}-LS_t)]-P_O\}*100\%)/P_O$.

7. The method of claim 1, wherein said PRRSC has one of a fixed or perpetual term.

8. The method of claim 1, wherein said designating a period for setting the periodic rate comprises the step of designating one of a fixed or a variable period for setting a dividend in an instance said PRRSC is an equity instrument, and designating one of a fixed or a variable period for setting an interest rate in an instance said PRRSC is a debt instrument.

9. The method of claim 1, wherein conversion of said PRRSC is non-dilutive to the Net Asset Value or book value of the PRRSC Issuer.

10. The method of claim 1, wherein said market environment includes one of an auction, negotiation and electronic means of matching.

11. The method of claim 1 wherein said auction is a Dutch auction.

12. The method of claim 1 further comprising the step of resetting the value of the periodic rate at the termination of said set period.

13. The method of claim 12 wherein said period is defined in contracted terms associated with said PRRSC.

14. The method of claim 1, wherein said PIRRSC issuer is one of a Closed-End Fund, a Real Estate Investment Trust, an investment grade issuer and a special purpose vehicle issuing asset backed securities.

15. A computer implemented method for an issuer of a periodic rate reset security with a conversion feature (PRRSC) to issue a collateralized security comprising the steps of:
   acquiring assets including at least one of convertible debt, convertible preferred stock, and other convertible assets of several issuers, and acquiring at least one of warrants, options and associated underlying securities in addition to the convertible assets when the assets are not convertible; and
   issuing first securities in one of a first tranches and series, wherein said first of said tranches or series includes said PRRSC, wherein said PRRSC is over-collateralized by the assets, has one of a dividend and an interest rate determined electronically and set periodically, and is convertible into a designated underlying security; and
   issuing second securities in one of a second tranche and series that are subordinate to and less over-collateralized by the assets associated with the first securities of the first tranche or series.

16. The method of claim 15 further comprising the step of issuing equity securities.

17. The method of claim 15 further comprising the step of setting at least one of a dividend and interest rate for the PRRSC of the collateralized securities by one of an auction, negotiation, and electronic means of matching.

18. The method of claim 17 wherein said auction includes a Dutch Auction.

19. The method of claim 15 further comprising the step of resetting one of a dividend or interest rate associated with the PRRSC at termination of a predefined period.

* * * * *